US008451992B2

(12) United States Patent
Knapp et al.

(10) Patent No.: US 8,451,992 B2
(45) Date of Patent: May 28, 2013

(54) MULTIMEDIA CALL PLATFORM

(75) Inventors: Chris Knapp, Colorado Springs, CO (US); George P. Demetriou, Colorado Springs, CO (US); Raj Gaurav, Colorado Springs, CO (US); Jason M. Kerekes, Colorado Springs, CO (US); James Patrick Sullivant, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 412 days.

(21) Appl. No.: 12/629,632

(22) Filed: Dec. 2, 2009

(65) Prior Publication Data

US 2011/0129072 A1   Jun. 2, 2011

(51) Int. Cl.
*H04M 1/64* (2006.01)
*H04M 3/42* (2006.01)

(52) U.S. Cl.
USPC .................................. 379/88.23; 379/201.01

(58) Field of Classification Search
USPC ................... 379/88.11–88.25; 455/413, 417, 455/456.3; 709/219, 227
See application file for complete search history.

(56) References Cited

U.S. PATENT DOCUMENTS

| 7,895,633 | B2 * | 2/2011 | Van Hoff et al. | 725/109 |
| 8,160,551 | B2 * | 4/2012 | Hadinata et al. | 455/413 |
| 2006/0015580 | A1 * | 1/2006 | Gabriel et al. | 709/219 |
| 2006/0085840 | A1 * | 4/2006 | Bruck et al. | 726/3 |
| 2006/0143664 | A1 * | 6/2006 | Hartselle et al. | 725/88 |
| 2006/0143665 | A1 * | 6/2006 | Meek et al. | 725/88 |
| 2007/0100690 | A1 * | 5/2007 | Hopkins | 705/14 |
| 2008/0051066 | A1 * | 2/2008 | Bandhole et al. | 455/413 |
| 2008/0148332 | A1 * | 6/2008 | Kassam et al. | 725/115 |
| 2008/0285578 | A1 * | 11/2008 | DeLay et al. | 370/412 |
| 2009/0070408 | A1 * | 3/2009 | White | 709/203 |
| 2009/0164640 | A1 * | 6/2009 | Schultz et al. | 709/227 |
| 2011/0236872 | A1 * | 9/2011 | Taylor | 434/350 |
| 2011/0296506 | A1 * | 12/2011 | Caspi | 726/6 |

OTHER PUBLICATIONS

Allan Tan, "SK Telecom Extends the Mobile Touch Experience with Video", Apr. 1, 2009, http://www.enterpriseinnovation.net/content/sk-telecom-extends-mobile-touch-experience-video?page=0%2CO, 2 pages.
Dan Butcher, Mobile Marketer, "AT&T Debuts Mobile Student Response Application", Aug. 27, 2008, http://www.mobilemarketer.com/cms/news/software-technology/1611.html, 3 pages.

* cited by examiner

*Primary Examiner* — Mohammad Islam

(57) ABSTRACT

A network device may maintain an association of a telephone number with information identifying a rule and information identifying multimedia content, where the telephone number is associated with the network device, and where the rule specifies when the multimedia content is to be provided in connection with a telephone call to the telephone number. The network device may further receive a telephone call from a user device, where the telephone call is directed to the telephone number; detect, in connection with the telephone call, that the rule has been satisfied; and provide the multimedia content to the user device in response to detecting that the rule has been satisfied.

24 Claims, 22 Drawing Sheets

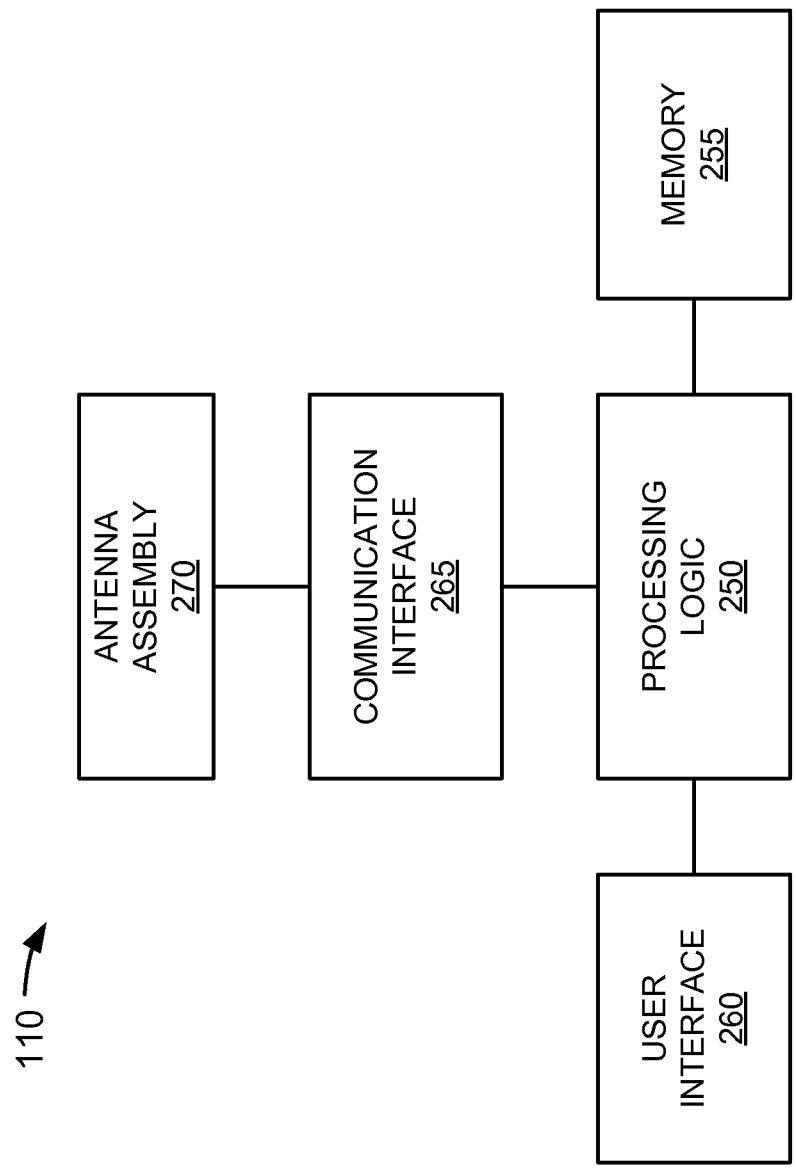

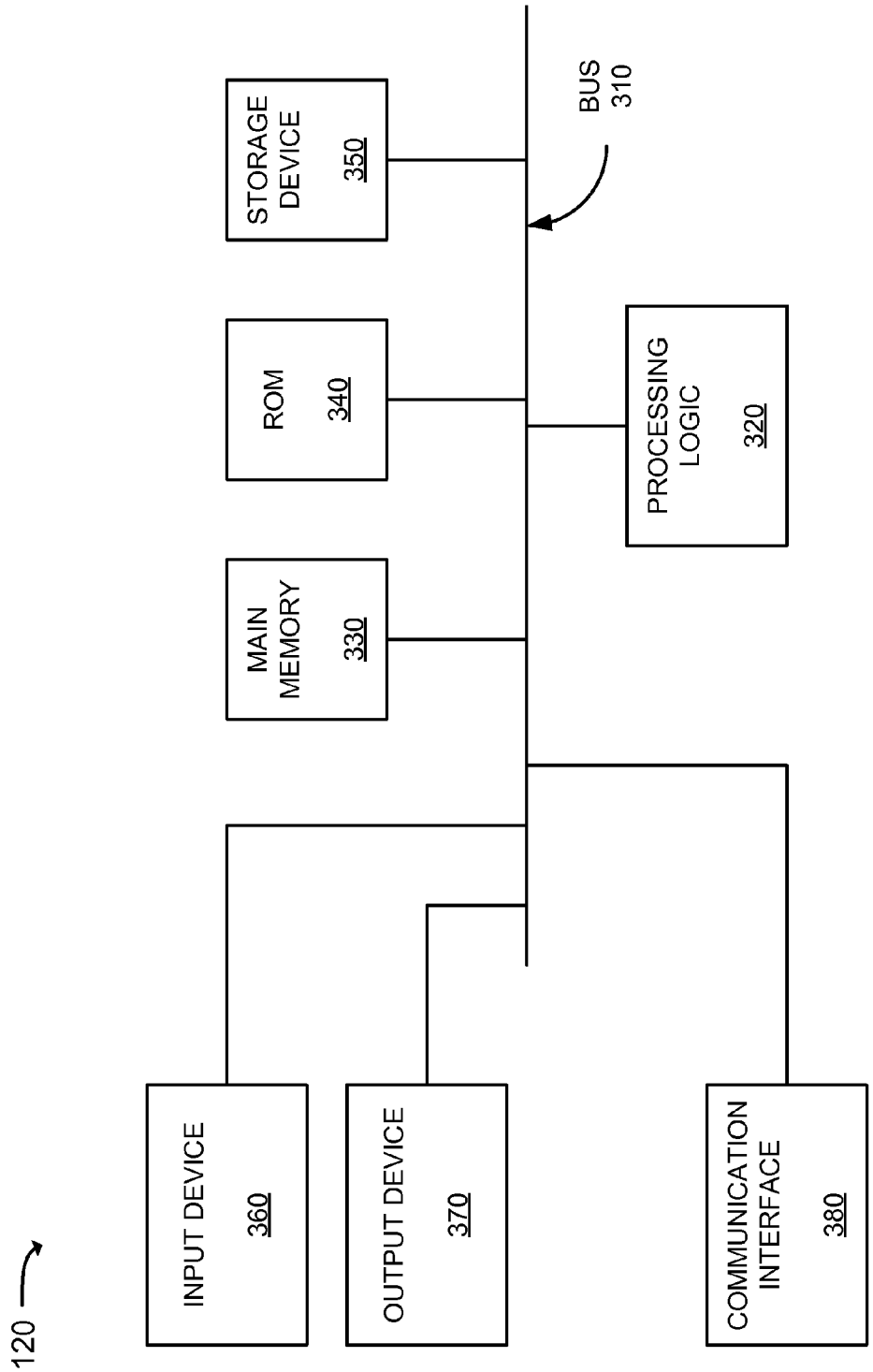

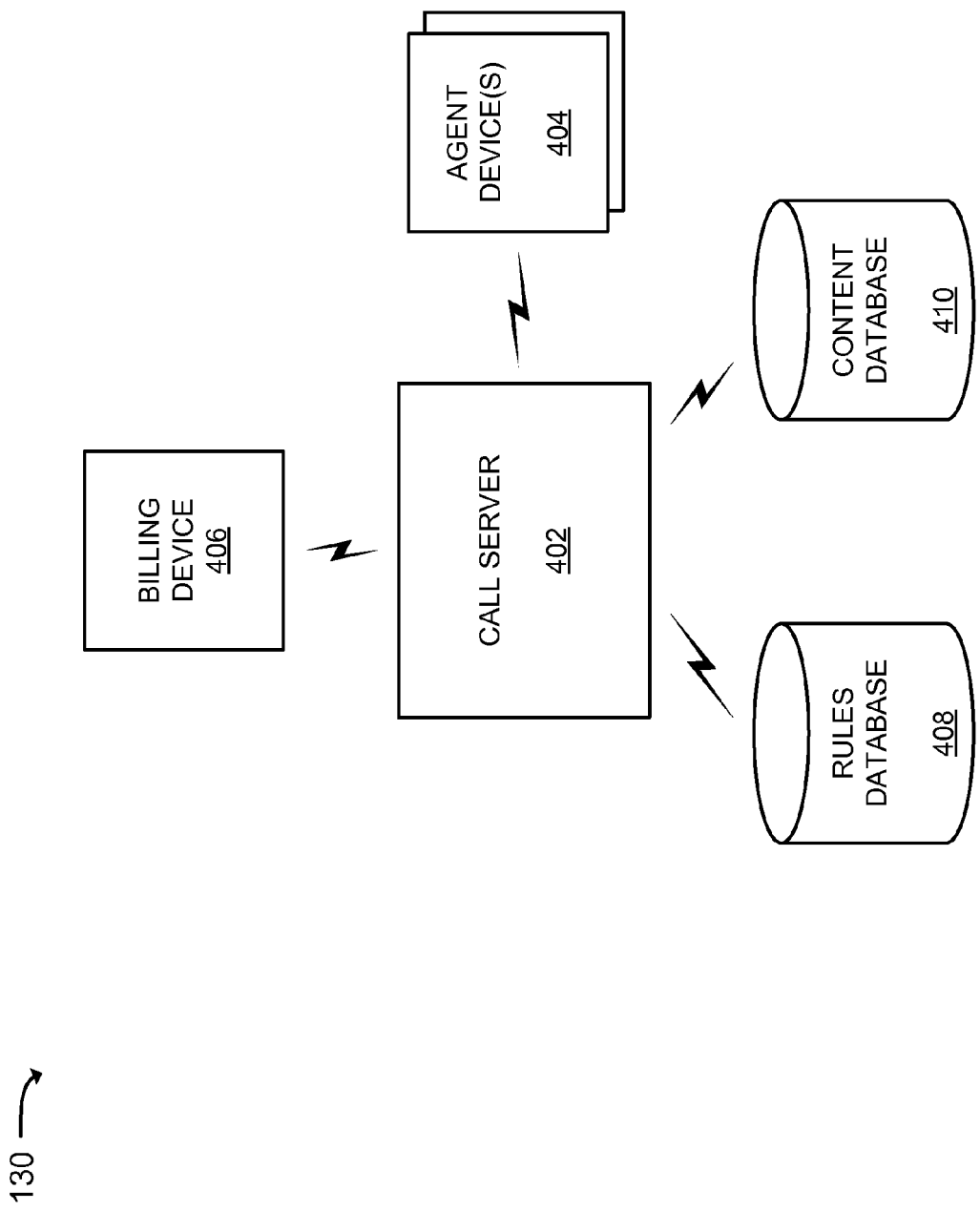

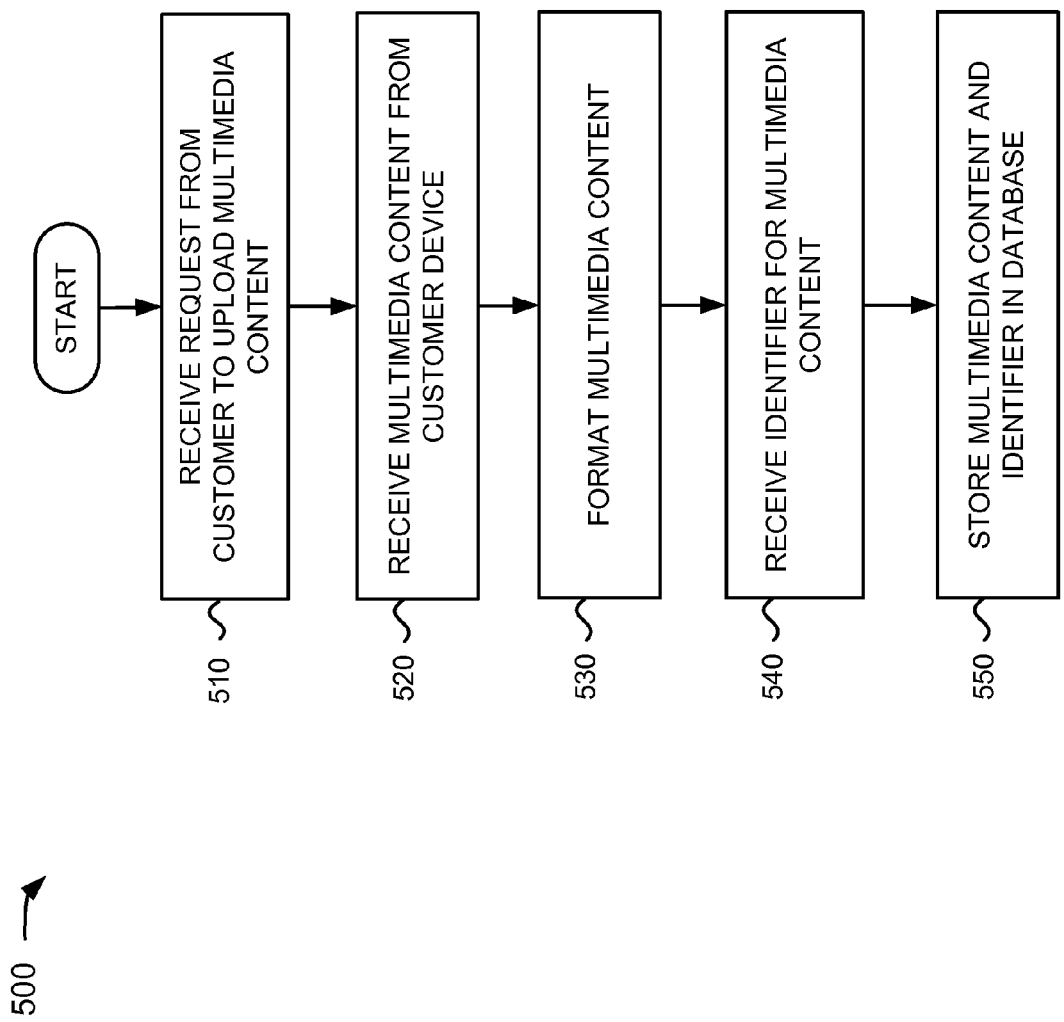

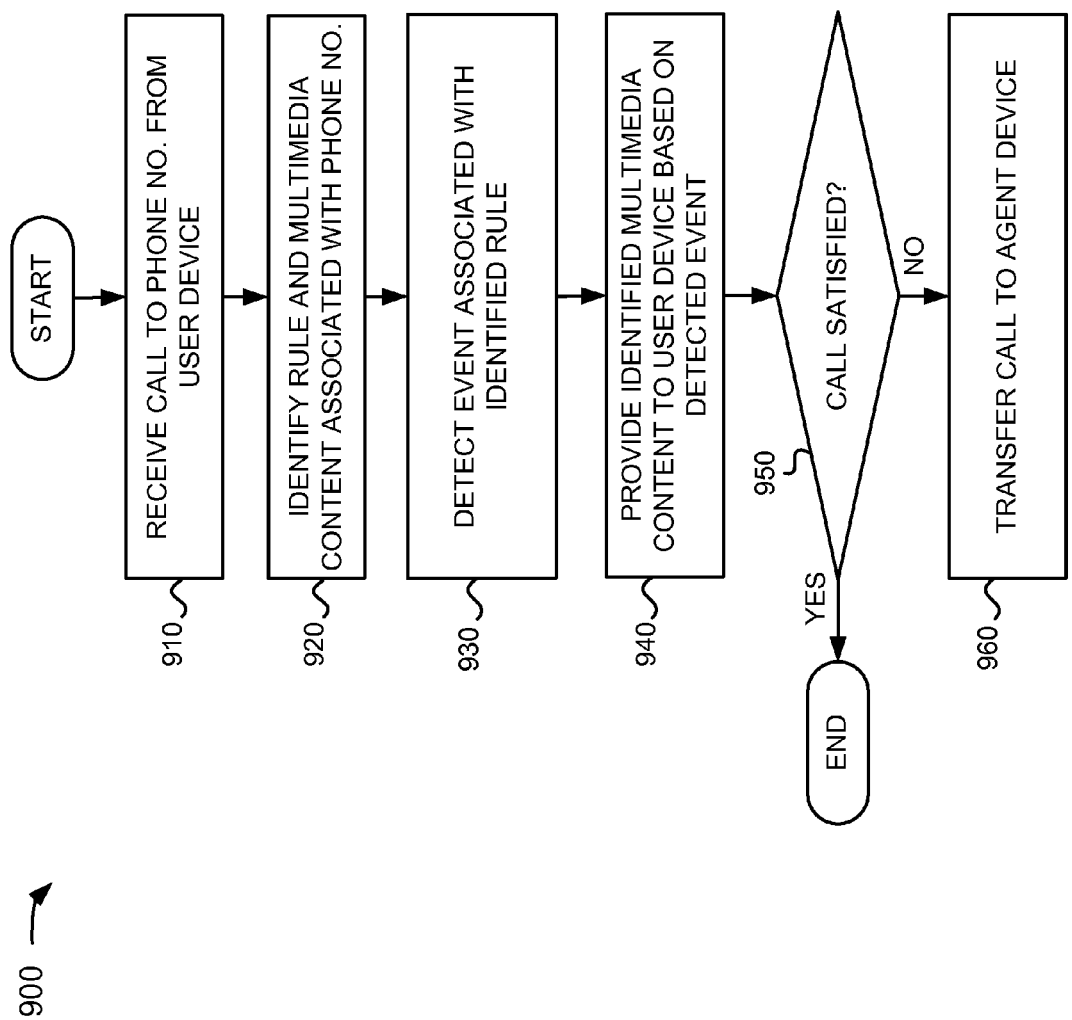

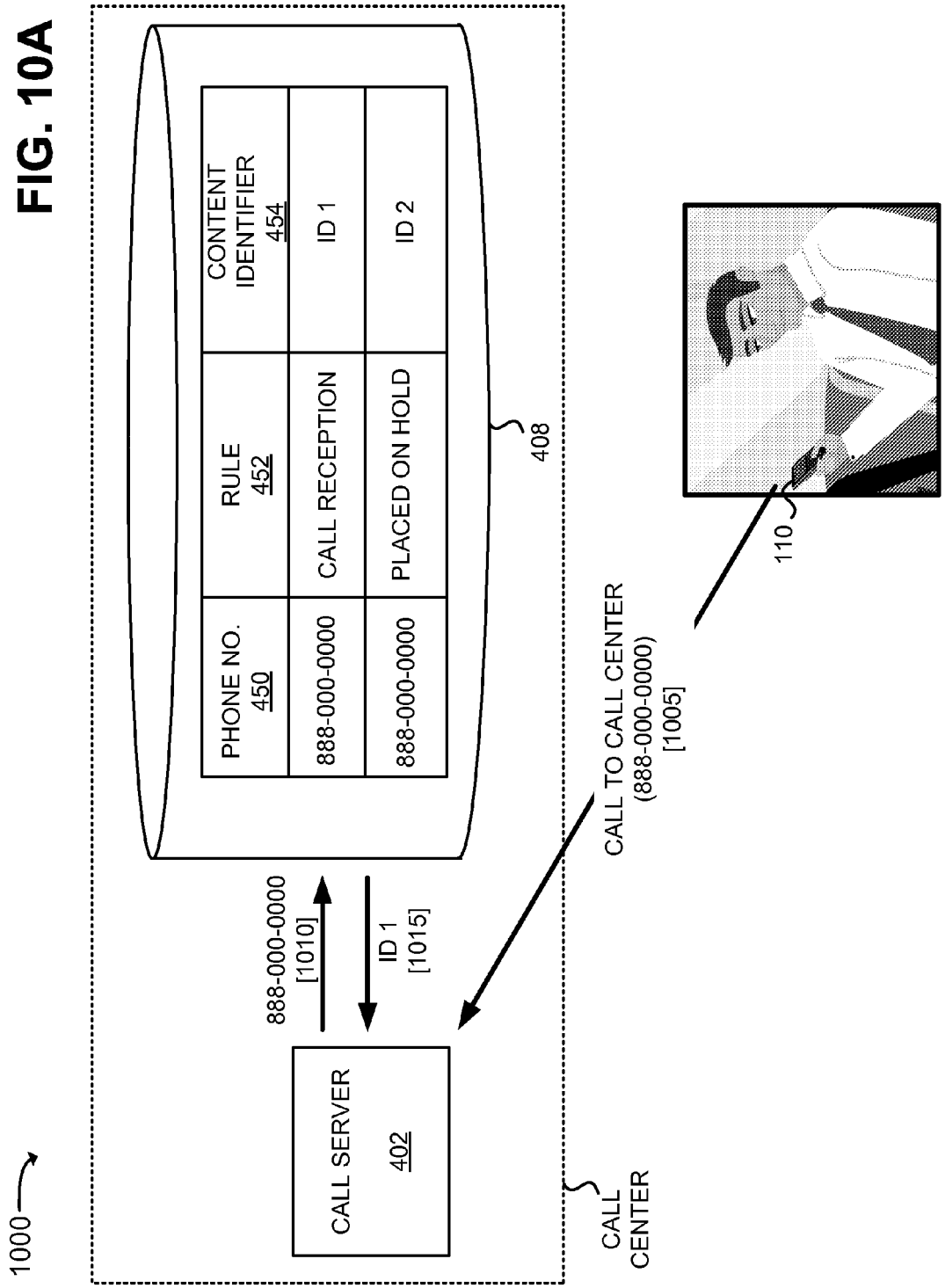

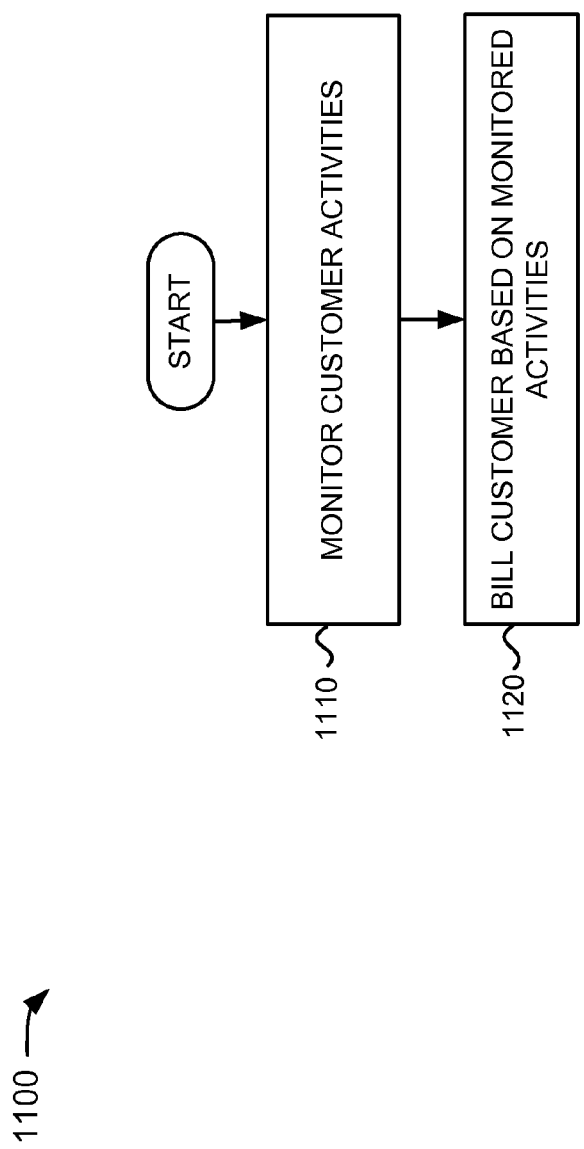

MULTIMEDIA CALL PLATFORM

BACKGROUND INFORMATION

A user may call a call center and be greeted with an audible message from an interactive voice response system. The user may audibly interact with the interactive voice response system to obtain information or connect to a call center agent.

BRIEF DESCRIPTION OF THE DRAWINGS

FIG. 2B is a diagram of exemplary components of the user device of FIGS. 1 and 2A;

FIG. 3 is a diagram of exemplary components of a customer device of FIG. 1;

FIG. 4A is a diagram of exemplary components of a multimedia call platform of FIG. 1;

FIG. 5 is a flow chart of an exemplary process for storing multimedia content according to implementations described herein;

FIG. 9 is a flow chart of an exemplary process for providing multimedia content to a user during a telephone call;

FIGS. 10A-10D provide an example of the processing described in FIG. 9; and

FIG. 11 is a flow chart of an exemplary process for generating billing events in connection with multimedia content.

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

Embodiments described herein relate to systems and/or methods that may provide multimedia content during telephone calls. For example, a customer may upload multimedia content to a multimedia call platform and set up rules for when the multimedia content is to be provided in connection with a telephone call. Thereafter, when a user calls the customer (e.g., using a toll-free number), the multimedia call platform may cause the multimedia content to be provided to the user, based on the rules. In one embodiment, the multimedia content may include video content and audio content.

While the following description focuses on providing multimedia content in connection with a telephone call to a call center, embodiments described herein are not so limited. In fact, embodiments described herein are equally applicable to providing multimedia content in connection with other types of "calls" to a call center. For example, a "call" may include a user selecting a link (e.g., a "connect to a live agent" link) on a web page, in response to the selection of a button on a remote control that causes a set-top box to connect to a call center, etc. In addition, embodiments described herein are not limited to providing multimedia content in connection with "calls" to a call center. Multimedia content may also provided in connection with "calls" to other devices outside of call centers.

Figure 1:
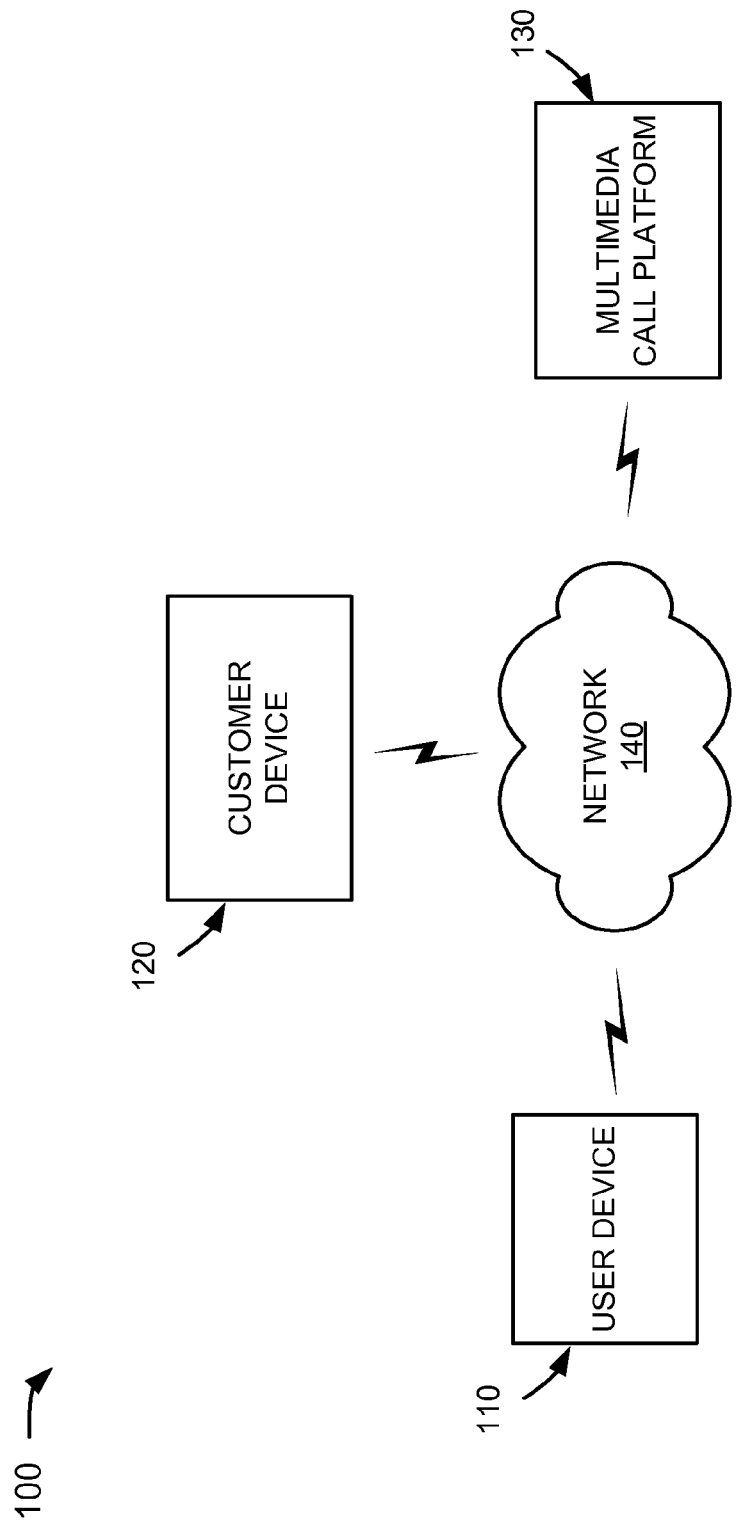
FIG. 1 is an exemplary environment in which systems and/or methods described herein may be implemented.

FIG. 1 is an exemplary environment 100 in which systems and/or methods described herein may be implemented. As illustrated, environment 100 may include a user device 110, a customer device 120, a multimedia call platform 130, and a network 140 that interconnects user device 110 and customer device 120 to multimedia call platform 130.

User device 110 may include a communication device, such as a communication device that is capable of initiating/receiving a call to/from another device. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), and/or other types of communication devices. In one embodiment, user device 100 may include the ability to receive and display multimedia content. User device 110 may connect to network 140 via wired and/or wireless connections.

Customer device 120 may include a device, such as a personal computer, a mainframe computer, a server, a lap top, a personal digital assistant (PDA), a wireless telephone, and/or other types of devices. In one embodiment, customer device 120 may allow a customer to interact with multimedia call platform 130 to upload multimedia content, delete multimedia content, and configure the provisioning of multimedia content, according to a set of rules, to a user device, such as user device 110. Customer device 120 may connect to network 140 via wired and/or wireless connections.

Multimedia call platform 130 may include one or more devices that store multimedia content and provide multimedia content in connection with received telephone calls. Multimedia call platform 130 may, for example, provide graphical user interfaces to customer device 120 for facilitating the uploading, deleting, and managing multimedia content and the creation and modification of associations of telephone numbers with rules that dictate when multimedia content is to be provided in connection with telephone calls to the telephone numbers. Additionally, multimedia call platform 130 may receive a telephone call (e.g., from a user of user device 110), process the received telephone call (e.g., by providing information to the user in connection with the telephone call, by routing the telephone call to a device, and/or by processing the received telephone call in other ways), and provide multimedia content to user device 110 in connection with the telephone call. In one embodiment, multimedia call platform 130 may correspond to or be associated with a customer's call center. Multimedia call platform 130 may connect to network 140 via wired and/or wireless connections.

Network 140 may include one or more networks of any type, including, for example, a local area network (LAN); a wide area network (WAN); a metropolitan area network (MAN); a telephone network, such as the Public Switched Telephone Network (PSTN) or a Public Land Mobile Network (PLMN); a satellite network; an intranet; the Internet; an Internet Protocol Multimedia Subsystem (IMS) network; or a combination of these or other types of networks. The PLMN(s) may further include a packet-switched network, such as, for example, a General Packet Radio Service (GPRS) network, a Cellular Digital Packet Data (CDPD) network, or a Mobile Internet Protocol (IP) network.

The number of components illustrated in FIG. 1 is provided for simplicity. In practice, a typical environment could include more or fewer components than illustrated in FIG. 1. Also, in some embodiments, one or more of the components of environment 100 may perform one or more tasks described as being performed by one or more other components of environment 100.

Figure 2A:
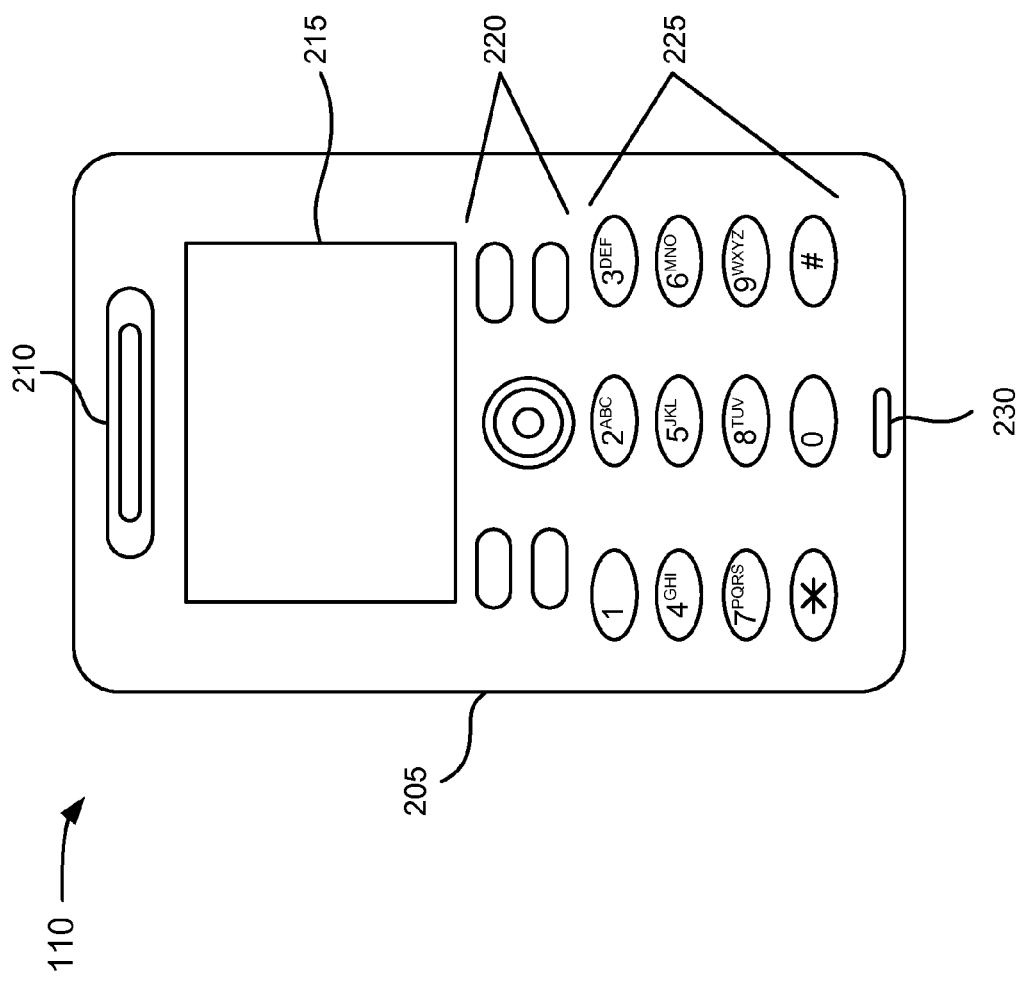
FIG. 2A is an exemplary front view of a user device of FIG. 1.

FIG. 2A is an exemplary front view of user device 110 in one embodiment described herein. As shown in FIG. 2A, user device 110 may include a housing 205, a speaker 210, a display 215, control buttons 220, a keypad 225, and a microphone 230. Housing 205 may protect the components of user device 110 from outside elements. Speaker 210 may provide audible information to a user of user device 110.

Display 215 may provide visual information to the user. For example, display 215 may display text input into user device 110, text, images, video, and/or graphics received from another device, such as multimedia call platform 130, and/or information regarding incoming or outgoing calls or text messages, emails, media, games, phone books, address books, the current time, etc. Control buttons 220 may permit the user to interact with user device 110 to cause user device 110 to perform one or more operations. For example, control buttons 220 may be used to cause user device 110 to transmit information. Keypad 225 may include a standard telephone keypad. Microphone 230 may receive audible information from the user.

Although FIG. 2A shows exemplary components of user device 110, in other embodiments, user device 110 may contain fewer, different, differently arranged, or additional components than depicted in FIG. 2A. Additionally, or alternatively, one or more components of user device 110 may perform one or more of the tasks described as being performed by one or more other components of user device 110.

FIG. 2B is a diagram of exemplary additional components of user device 110. As shown in FIG. 2B, user device 110 may include processing logic 250, memory 255, a user interface 260, a communication interface 265, and/or an antenna assembly 270. Processing logic 250 may include one or more processors, microprocessors, application specific integrated circuits (ASICs), field programmable gate arrays (FPGAs), etc. Processing logic 250 may control operation of user device 110 and its components. Memory 255 may include a random access memory (RAM), a read-only memory (ROM), and/or another type of memory to store data and instructions that may be used by processing logic 250.

User interface 260 may include mechanisms for inputting information to user device 110 and/or for outputting information from user device 110. Examples of input and output mechanisms might include buttons (e.g., control buttons 220, keys of keypad 225, a joystick, etc.) to permit data and control commands to be input into user device 110; a speaker (e.g., speaker 210) to receive electrical signals and output audio signals; a microphone (e.g., microphone 230) to receive audio signals and output electrical signals; a display (e.g., display 215) to output visual information (e.g., text input into user device 110); a vibrator to cause user device 110 to vibrate; and/or a camera to receive video and/or images.

Communication interface 265 may include, for example, a transmitter that may convert baseband signals from processing logic 250 to radio frequency (RF) signals and/or a receiver that may convert RF signals to baseband signals. Alternatively, communication interface 265 may include a transceiver to perform functions of both a transmitter and a receiver. Communication interface 265 may connect to antenna assembly 270 for transmission and/or reception of the RF signals. Antenna assembly 270 may include one or more antennas to transmit and/or receive RF signals over the air. Antenna assembly 270 may, for example, receive RF signals from communication interface 265 and transmit the RF signals over the air, and receive RF signals over the air and provide them to communication interface 265. In one embodiment, for example, communication interface 265 may communicate with a network, such as network 140.

As will be described in detail below, user device 110 may perform certain operations in response to processing logic 250 executing software instructions of an application contained in a computer-readable medium, such as memory 255. A computer-readable medium may be defined as a logical or physical memory device. A logical memory device may include a space within a single physical memory device or spread across multiple physical memory devices.

The software instructions may be read into memory 255 from another computer-readable medium or from another device via communication interface 265. The software instructions contained in memory 255 may cause processing logic 250 to perform processes that will be described later. Alternatively, hardwired circuitry may be used in place of or in combination with software instructions to implement processes described herein. Thus, embodiments described herein are not limited to any specific combination of hardware circuitry and software.

Although FIG. 2B shows exemplary components of user device 110, in other embodiments, user device 110 may contain fewer, different, differently arranged, or additional components than depicted in FIG. 2B. Additionally, or alternatively, one or more components of user device 110 may perform one or more of the tasks described as being performed by one or more other components of user device 110.

FIG. 3 is a diagram of exemplary components of customer device 120, according to an exemplary embodiment. As shown in FIG. 3, customer device 120 may include a bus 310, a processing logic 320, a main memory 330, a ROM 340, a storage device 350, an input device 360, an output device 370, and a communication interface 380. In another embodiment, customer device 120 may include fewer, different, differently arranged, or additional components than are illustrated in FIG. 3.

Bus 310 may include a path that permits communication among the components of customer device 120. Processing logic 320 may include one or more processors, microprocessors, ASICs, FPGAs, and/or other types of processing logic that may interpret and execute instructions. Main memory 330 may include a RAM or another type of dynamic storage device that may store information and instructions for execution by processing logic 320. ROM 340 may include a ROM device or another type of static storage device that may store static information and instructions for use by processing logic 320. Storage device 350 may include a magnetic and/or optical recording medium and its corresponding drive, or a removable form of memory, such as a flash memory.

Input device 360 may include a mechanism that permits an operator to input information to customer device 120, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables customer device 120 to communicate with other devices and/or systems. For example, communication interface 380 may include mechanisms for communicating with another device or system via a network, such as network 140.

As will be described in detail below, customer device 120 may perform certain multimedia content-related operations. Customer device 120 may perform these operations in response to processing logic 320 executing software instructions contained in a computer-readable medium, such as memory 330. The software instructions may be read into memory 330 from another computer-readable medium, such as storage device 350, or from another device via communication interface 380. The software instructions contained in memory 330 may cause processing logic 320 to perform processes that will be described later. Alternatively, hardwired circuitry may be used in place of or in combination with software instructions to implement processes described herein. Thus, embodiments described herein are not limited to any specific combination of hardware circuitry and software.

FIG. 4A is an exemplary diagram of multimedia call platform 130, according to an exemplary embodiment. As illustrated, multimedia call platform 130 may include a call server 402, one or more agent devices 404 (also referred to singularly as "agent device 404"), a billing device 406, a rules database 408, and a content database 410. In one embodiment, multimedia call platform 130 may include a Next Generation Service Network (NGSN) that interconnects one or more of call server 402, agent devices 404, billing device 406, rules database 408, or content database 410.

Call server 402 may include one or more servers or other network devices that may process calls received from user devices, such as user device 110. For example, call server 402 may receive a call from user device 110, route the call to an appropriate agent device (such as one of agent devices 404), monitor the call between user device 110 and agent device 404, and provide, according to a set of rules, multimedia content to user device 110 at reception and/or during the call. In addition, call server 402 may allow a customer at, for example, customer device 120 to upload multimedia content to call server 402, delete multimedia content from call server 402, and manage the multimedia content, by, for example, configuring and/or editing rules for provisioning multimedia content in connection with calls.

Agent devices 404 may include devices capable of receiving and placing a telephone call. For example, each agent device 404 may include a Plain Old Telephone System (POTS) phone, a wireless telephone, a personal computer, a mainframe computer, a server, a lap top, a personal digital assistant (PDA), and/or another type of device capable of receiving and placing a telephone call. In one embodiment, agent devices 404 may be part of a customer's call center. Agent devices 404 may connect to call server 402 via wired and/or wireless connections.

Billing device 406 may include one or more devices capable of detecting events and generating billing information for the detected events. For example, billing device 406 may include a personal computer, a mainframe computer, a server, a lap top, and/or another type of device capable of generating billing information. In one embodiment, billing device 406 may receive information regarding a customer's management of multimedia content (e.g., information identifying the uploading of multimedia content to multimedia content platform 130, information identifying the amount of multimedia content stored at multimedia content platform 130 by a customer, information identifying when multimedia content is provided to a user in association with the customer, and/or other types of information) and generate billing information in response thereto. Billing device 406 may connect to call server 402 via wired and/or wireless connections.

Rules database 408 may store information that associates a customer's telephone number with one or more rules and information identifying one or more multimedia content that are to be provided in accordance with the one or more rules. Rules database 408 may connect to call server 402 via wired and/or wireless connections. Content database 410 may store multimedia content and/or links to multimedia content. In one embodiment, content database 410 may be implemented within a service controller firmware component of a customer's call center. Content database 410 may connect to call server 402 via wired and/or wireless connections.

Although FIG. 4A illustrates an exemplary arrangement of multimedia call platform 130, in other embodiments, multimedia call platform may include fewer, different, differently arranged, or additional components than those depicted in FIG. 4A. Additionally, or alternatively, one or more components of multimedia call platform 130 may perform one or more tasks described as being performed by one or more other components of multimedia call platform 130.

Figure 4B:
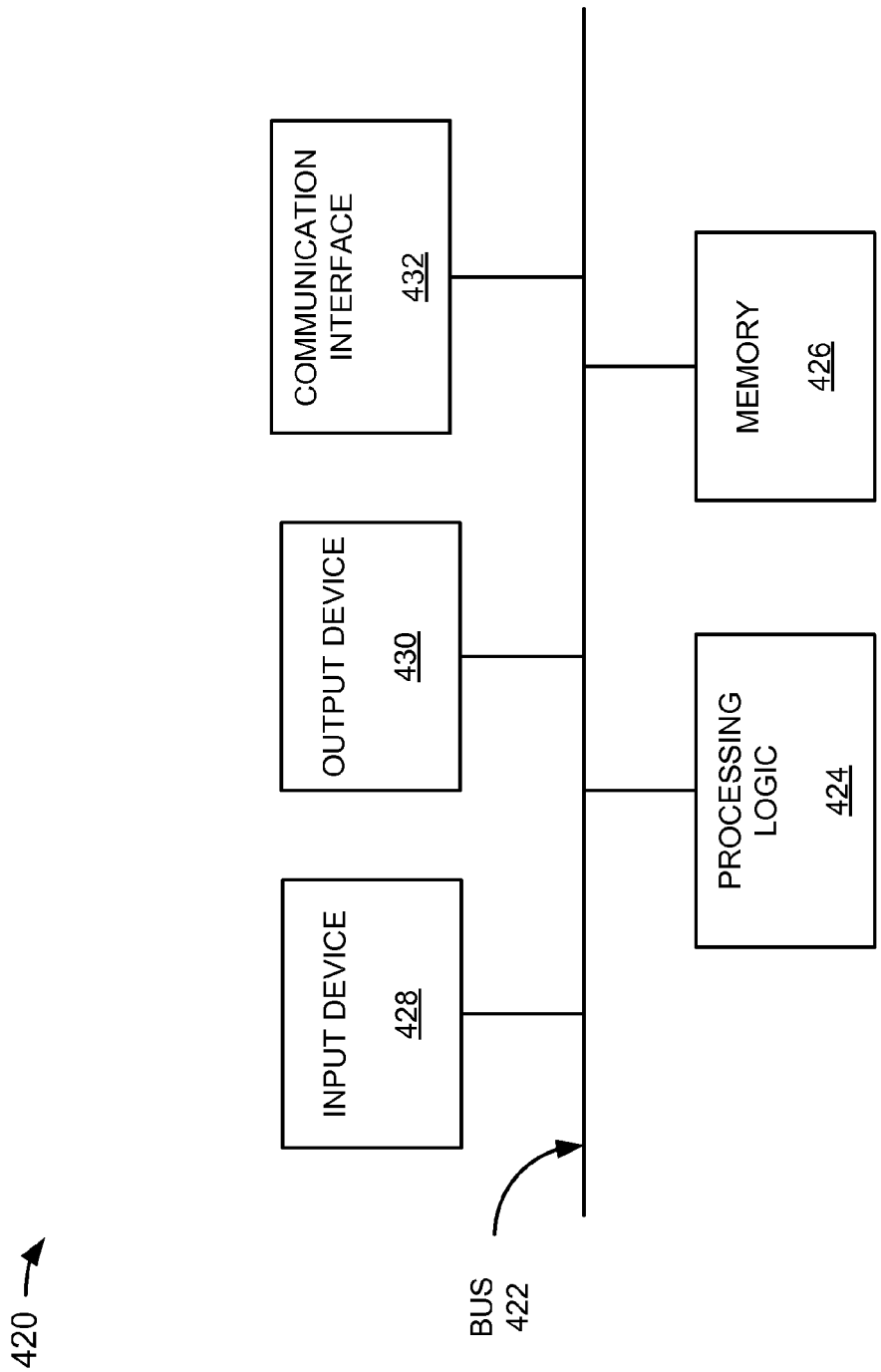
FIG. 4B is a diagram of exemplary components of a call server, an agent device, and/or a billing device of FIG. 4A.

FIG. 4B is a diagram of exemplary components of an entity 420 according to an exemplary embodiment. Entity 420 may correspond to call server 402, an agent device 404, and/or billing device 408. As illustrated, entity 420 may include a bus 422, processing logic 424, a memory 426, an input device 428, an output device 430, and a communication interface 432.

Bus 422 may permit communication among the components of entity 420. Processing logic 424 may include one or more processors and/or microprocessors that interpret and execute instructions. Additionally or alternatively, processing logic 424 may be implemented as or include one or more ASICs, FPGAs, or the like. Memory 426 may include a RAM or another type of dynamic storage device that stores information and instructions for execution by processing logic 424, a ROM or another type of static storage device that stores static information and instructions for the processing logic 424, and/or some other type of magnetic or optical recording medium and its corresponding drive for storing information and/or instructions.

Input device 428 may include a device that permits an operator to input information to entity 420, such as a keyboard, a keypad, a mouse, a pen, a microphone, one or more biometric mechanisms, and the like. Output device 430 may include a device that outputs information to the operator, such as a display, a speaker, etc.

Communication interface 432 may include any transceiver-like mechanism that allows entity 420 to communicate with other devices and/or systems. For example, communication interface 432 may include mechanisms for communicating with components within environment 100.

As will be described in detail below, entity 420 may perform call-related processing. Entity 420 may perform these and other functions in response to processing logic 424 executing software instructions contained in a computer-readable medium, such as memory 426. The software instructions may be read into memory 426 from another computer-readable medium or from another device via communication interface 432. The software instructions contained in memory 426 may cause processing logic 424 to perform processes that will be described later. Alternatively, hardwired circuitry may be used in place of or in combination with software instructions to implement processes consistent with embodiments described herein. Thus, systems and methods described herein are not limited to any specific combination of hardware circuitry and software.

Although FIG. 4B illustrates an exemplary arrangement of entity 420, in some embodiments, entity 420 may include fewer, different, differently arranged, or additional components than those depicted in FIG. 4B. Additionally, or alternatively, one or more components of entity 420 may perform one or more tasks described as being performed by one or more other components of entity 420.

Figure 4C:
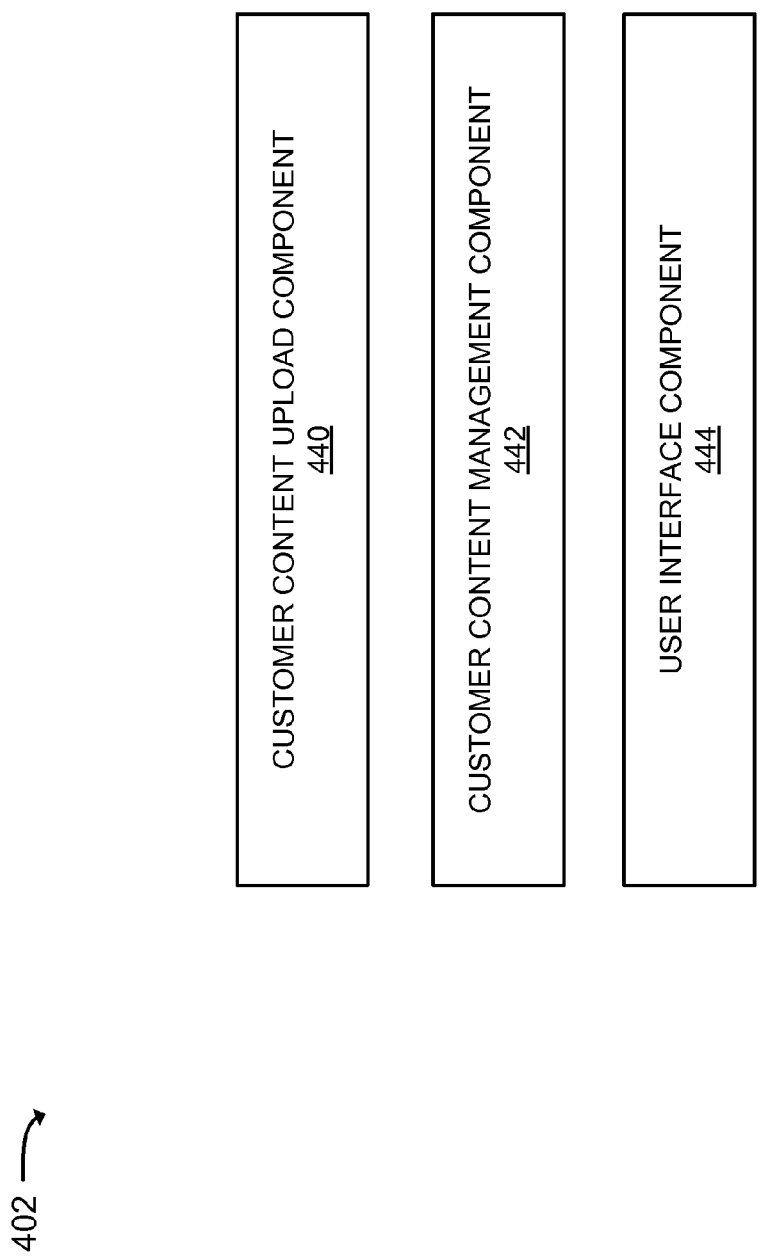
FIG. 4C is a diagram of exemplary functional components of a portion of the call server of FIG. 4A.

FIG. 4C is a diagram of exemplary functional components of a portion of call server 402, according to an exemplary embodiment. In one embodiment, the functional blocks described in connection with FIG. 4C may be implemented via, for example, processing logic 424 executing instructions contained in memory 426. As illustrated, call server 402 may include a customer content upload component 440, a customer content management component 442, and a user interface component 444.

Customer content upload component 440 may include one or more components that allow a customer, at a customer device, such as customer device 120, to upload multimedia content. In one embodiment, customer content upload component 440 may authenticate a customer at, for example, customer device 120, provide one or more graphical user interfaces to customer device 120 to allow for multimedia content to be uploaded to multimedia call platform 130, and/or provide other functions in connection with the uploading of multimedia content to multimedia call platform 130. Additionally, customer content upload component 440 may monitor the uploading of content from customer device 120 and send, to billing device 406, information identifying the multimedia content uploaded, the size of the multimedia content uploaded, a time that it took to uploaded the multimedia content, and/or other information relating to the multimedia content.

Customer content management component 442 may include one or more components that allow a customer, at a customer device, such as customer device 120, to manage multimedia content stored at multimedia call platform 130. For example, customer content management component 442 may provide one or more graphical user interfaces that allow a customer to delete multimedia content; associate a telephone number with one or more rules and multimedia content to provide upon call reception; associate a telephone number with one or more rules and multimedia content to provide during a call; edit associations of telephone numbers, rules, and multimedia content; delete associations of telephone numbers, rules, and multimedia content; and/or perform other management functions in relation to multimedia content stored at multimedia call platform 130. Additionally, customer content management component 442 may monitor a customer's management of multimedia content and send information identifying the customer's actions to billing device 406.

User interface component 444 may include one or more components that receive a telephone call from a user device, such as user device 110, and provide multimedia content in connection with the telephone call. User interface component 444 may provide the multimedia content based on the set of rules, associated with the telephone number dialed by the user of user device 110. User interface component 444 may also cause a telephone call to be transferred to an appropriate agent device 404. Additionally, user interface component 444 may monitor the provisioning of multimedia content in connection with a telephone call (e.g., a date and time when multimedia content was provided, the telephone number that was dialed, a size of the multimedia content that was provided to user device 110, and/or other information) and provide information relating to the monitoring to billing device 406. The monitoring of a call may, for example, continue even after the call is transferred to an agent device 404 (e.g., until the call has been terminated).

Although FIG. 4C illustrates an exemplary arrangement of call server 402, in other embodiments, call server 402 may include fewer, different, differently arranged, or additional functional components than those depicted in FIG. 4C. Additionally, or alternatively, one or more functional components of call server 402 may perform one or more tasks described as being performed by one or more other functional components of call server 402.

Figure 4D:
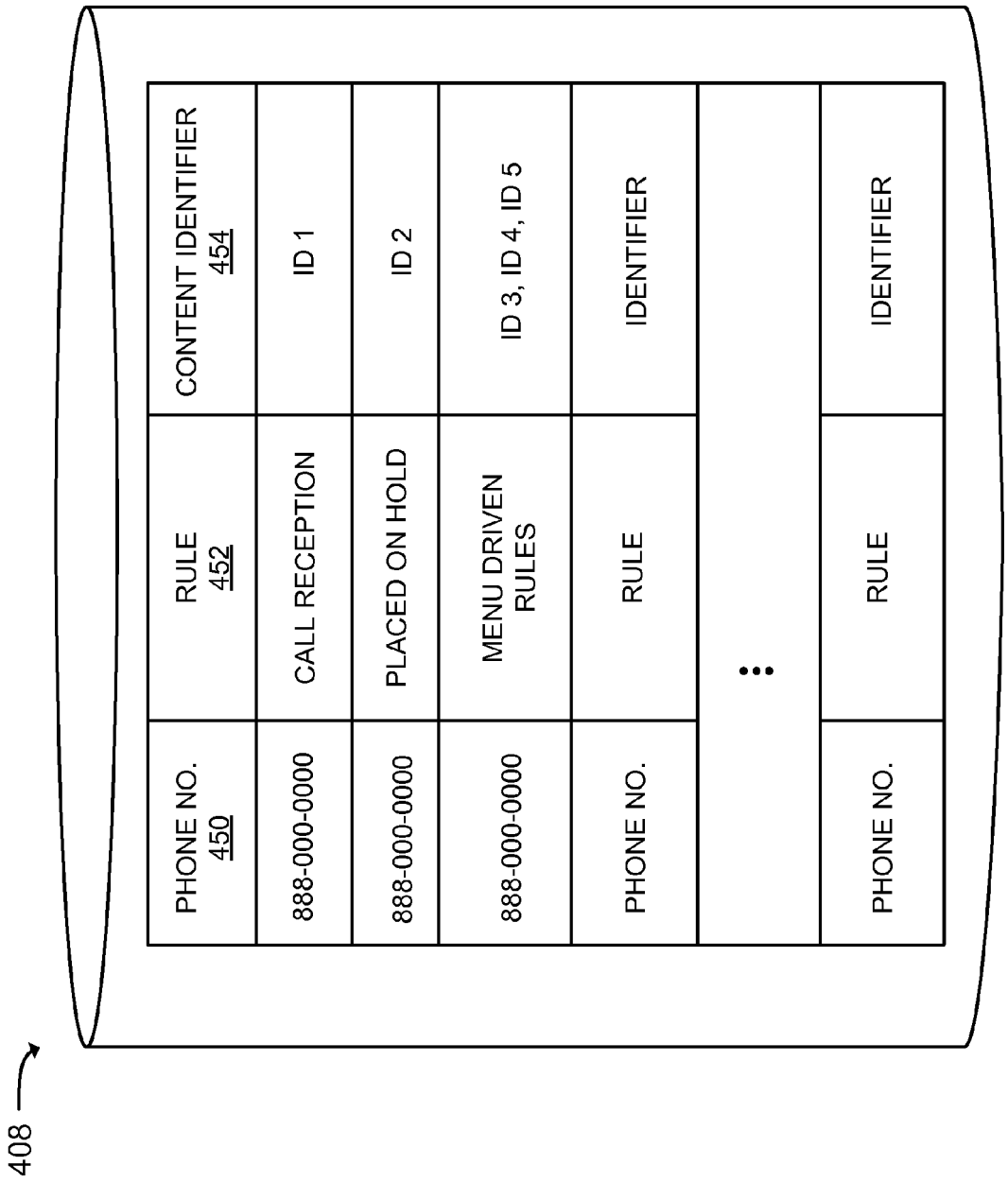
FIG. 4D is an exemplary diagram of a rules database of FIG. 4A.

FIG. 4D is an exemplary diagram of rules database 408, according to an exemplary embodiment. While one database is described below, it will be appreciated that rules database 408 may consist of multiple databases stored locally at multimedia call platform 130, or stored at one or more different and possibly remote locations.

As illustrated, rules database 408 may include a group of entries in the following exemplary fields: a phone number field 450, a rule field 452, and a content identifier field 454. Phone number field 450 may store information identifying a telephone number, associated with a customer, that may be dialed by a user of a user device, such as user device 110. Phone number field 450 may store the telephone number in the North American Numbering Plan format, a Session Initiation Protocol (SIP) format, or another format. In one embodiment, phone number field 450 may store information identifying a toll-free telephone number. In this situation, phone number field 450 may store the telephone number in the North American Numbering Plan format. Although not shown in FIG. 4D, phone number field 450 may be associated with or include telephone number extension information.

Rule field 452 may store one or more rules for the phone number identified in phone number field 450. In one embodiment, a rule may be dependent on an event that may occur in connection with a telephone call or dependent on an input from the user of a user device, such as user device 110. With respect to an event occurring in connection with a telephone call, a rule may specify, for example, that particular multimedia content is to be provided based on a time of day, a day of a week, a telephone number of the calling party, a location of the calling party, a telephone call being received, a telephone call being placed on hold, in connection with a menu (e.g., call server 402 may provide a video menu to a caller to give the caller a decision point for navigating through a call tree (for example, 1—place order, 2—cancel order, 3—check status of order, 4—talk with sales representative)), and/or based on other events. With respect to an input from the user, a rule may specify, for example, that particular multimedia content is to be provided based on the user saying a particular word, selecting a particular key or sequence of keys on user device 110, and/or based on other events. For example, call server 402 may provide a user with the options of "Press 1 for a message from our CEO" or "Press 0 for Help with this topic." A rule may specify the appropriate multimedia content to provide to the user based on the option selected by the user. In some embodiments, rule field 452 may store more than one rule for a particular telephone number identified in phone number field 450. Rule field 452 may also specify a priority for at least one of the rules, when rule field 452 stores more than one rule.

Content identifier field 454 may store a sequence of characters that identifies multimedia content that is to be provided when the rule specified in rule field 452, for the telephone number in phone number field 450, is satisfied. The sequence of characters may be automatically generated or supplied by a customer, such as a customer associated with customer device 120. In one embodiment, content identifier field 454 may store more than one identifier and, for example, an order in which the multimedia content, corresponding to the more than one identifier, are to be provided.

As an example and as illustrated in FIG. 4D, rule database 408 may include an entry specifying that upon call reception and for telephone number 888-000-0000, multimedia content identified by ID 1 is to be provided to the calling device, such as user device 110.

Although FIG. 4D illustrates an exemplary arrangement of fields of rule database 408, in other embodiments, rule database 408 may include fewer, different, differently arranged, or additional fields than those depicted in FIG. 4D.

Figure 4E:
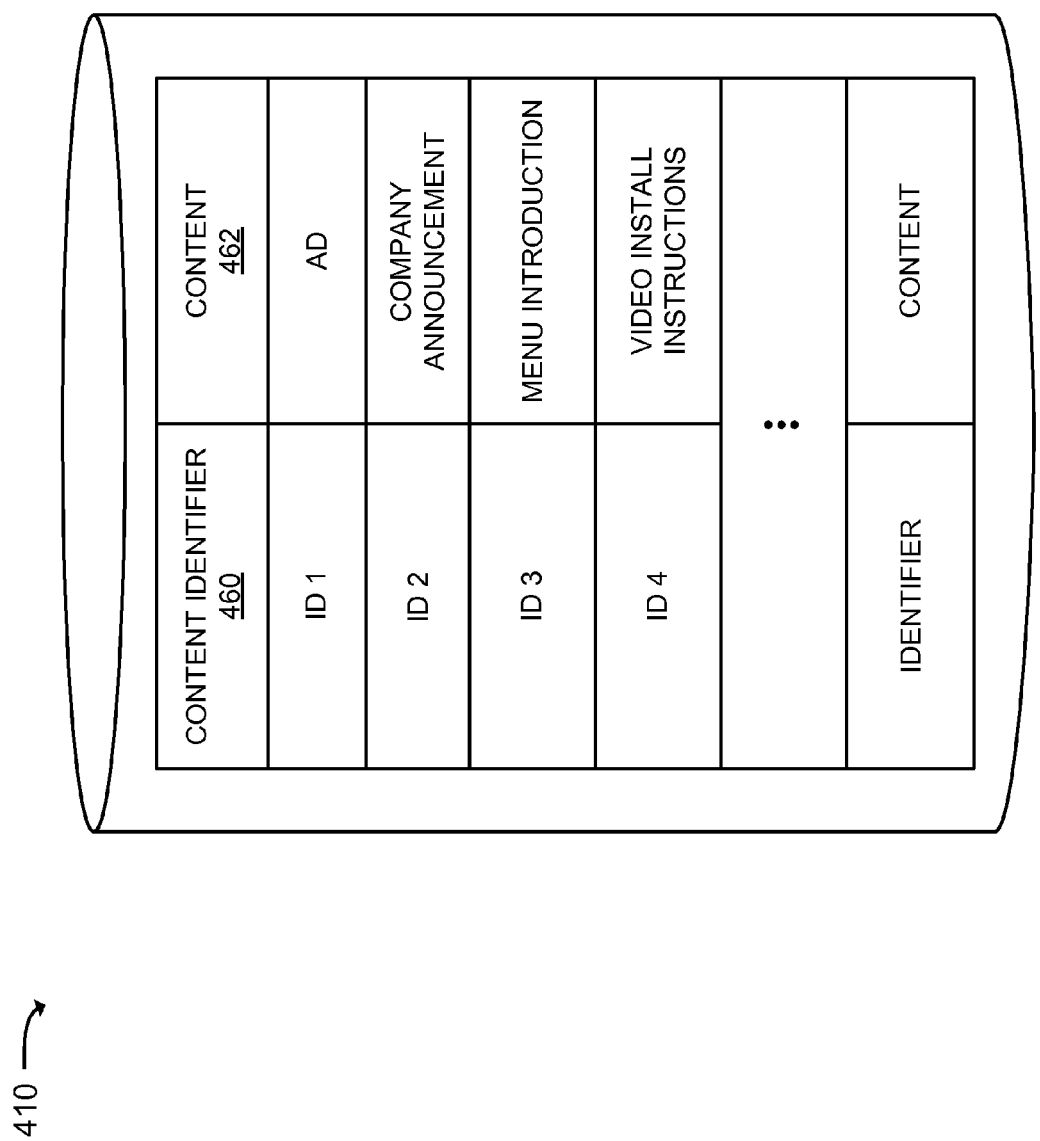
FIG. 4E is an exemplary diagram of a content database of FIG. 4A.

FIG. 4E is an exemplary diagram of content database 410, according to an exemplary embodiment. While one database is described below, it will be appreciated that content database 410 may consist of multiple databases stored locally at multimedia call platform 130, or stored at one or more different and possibly remote locations.

As illustrated, content database 410 may maintain a group of entries in the following exemplary fields: a content identifier field 460 and a content field 462. Content database 410 may maintain additional or different information than that illustrated in FIG. 4E.

Content identifier field 460 may store a sequence of characters that identifies multimedia content. The sequence of characters may be automatically generated or supplied by a customer, such as a customer associated with customer device 120.

Content field 462 may store multimedia content or one or more links to multimedia content that is associated with the identifier in content identifier field 460. The multimedia content may include, for example, one or more video files (including video portions and audio portions). The multimedia content may include, for example, video help files (e.g., to reduce the amount of hands-on human contact needed when calling a customer support number), video pages for a products and services catalog, television advertisements (e.g., to generate consumer interest in a customer's latest products and services), business-specific video messages to play based upon a caller's originating number or the call's originating location (e.g., to reach Pizza Restaurant in Colorado Springs press 1, to reach Pizza Restaurant in Denver press 2), etc., and/or other types of multimedia content.

Although FIG. 4E illustrates an exemplary arrangement of fields of content database 410, in other embodiments, content database 410 may include different, differently arranged, or additional fields than those depicted in FIG. 4E.

FIG. 5 is a flow chart of an exemplary process 500 for storing multimedia content consistent with exemplary embodiments. The processing described in FIG. 5 may be performed by call server 402 (e.g., customer content upload component 440). In another embodiment, some or all of the processing described in FIG. 5 may be performed by one or more devices separate from or in combination with call server 402.

Process 500 may include receiving a request from a customer to upload multimedia content (block 510). A customer may, using customer device 120, connect to call server 402. In one embodiment, customer 120 may connect to call server 402 via an Internet connection. In response, call server 402 may provide one or more graphical user interfaces (e.g., web pages) to customer device 120 to authenticate the customer. For example, call server 402 may request that the customer provide an identifier and/or password. Call server 402 may match the identifier and password to a list of registered identifier/password combinations. If the identifier and password match a registered identifier/password in the list, call server 402 may determine that the customer is properly authenticated. If the identifier and password do not match a registered identifier/password in the list, call server 402 may determine that the customer is not properly authenticated.

Figure 6:
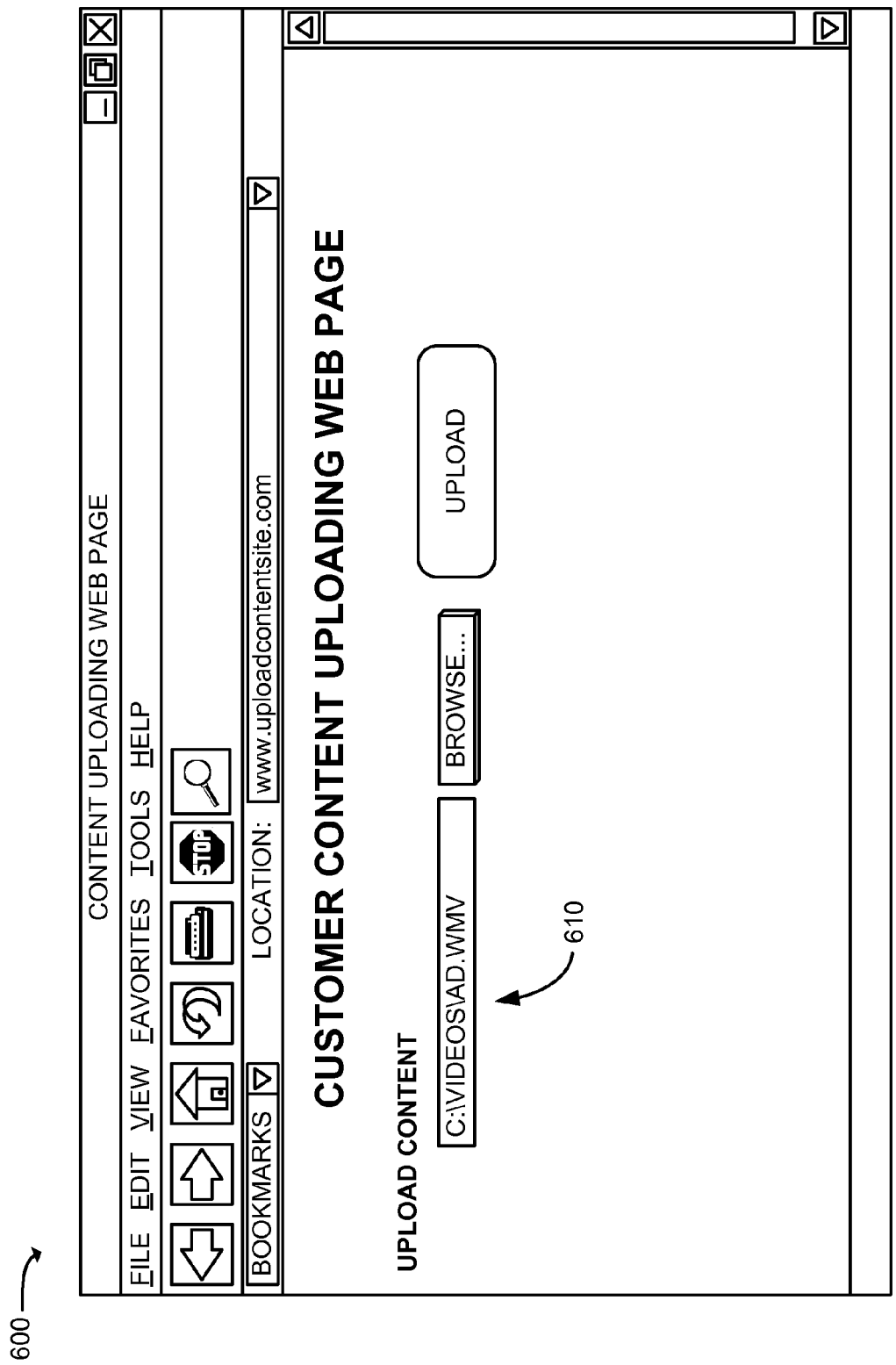
FIG. 6 is an exemplary diagram of a graphical user interface that may be used to store multimedia content.

In response to the request (and authentication of the customer), call server 402 may provide a graphical user interface to the customer allowing the customer to upload multimedia content to call server 402. The word "upload" is used herein to refer to not only the transfer of multimedia content to multimedia call platform 130 from customer device 120 or another device, but also to the selection of multimedia content, stored at multimedia call platform 130, by the customer. Thus, multimedia call platform 130 may maintain a library of multimedia content that a customer may use, in connection with telephone calls, to provide to user devices, such as user device 110. FIG. 6 is an exemplary diagram of a graphical user interface 600 that may be provided to customer device 120 to allow for uploading of multimedia content. As illustrated, user interface 600 may include a field 610 via which the customer may specify a particular multimedia file to upload to call server 402 and a location of the particular multimedia file. The customer may specify a location that is local to customer device 120, a location that is associated with multimedia call platform 130 (e.g., in content database 410), or a location that is remote from customer device 120 and unassociated with multimedia call platform 130 (e.g., on a web site).

Returning to FIG. 5, process 500 may further include receiving multimedia content from a customer device (block 520). For example, as set forth above, call server 402 may provide one or more graphical user interfaces, such as graphical user interface 600, to customer device 120, that allow the customer to upload multimedia content. The uploading may include transferring multimedia content from customer device 120, receiving selection, from the customer, of multimedia content from a database of multimedia content that is associated with call server 402 (e.g., content database 410), and/or receiving the multimedia content from a device that is unassociated with customer device 120 and unassociated with call server 402 (e.g., where the customer specifies an identity and location of the multimedia content from which the multimedia content may be obtained).

Process 500 may also include formatting the received multimedia content (block 530). For example, in one embodiment, call server 402 may determine a size of the received multimedia content and, if the size is greater than a predetermined maximum threshold, reduce the size of the received multimedia content, or request that the customer upload a smaller file. As another example, call server 402 may determine the format of the multimedia content (e.g., an Audio Video Interleave (AVI) format, a Moving Picture Experts Group (MPEG) format, a Windows Media Video (WMV) format, an Advanced Streaming Format (ASF) format, a QuickTime Movie (MOV) format, or another multimedia format), and convert the received format to a particular format. In one embodiment, call server 402 may convert received multimedia content to a format that includes separate video and audio segments, such as the MPEG-4 (MP4) format.

Process 500 may further include receiving an identifier for the multimedia content (block 540). For example, call server 402 may obtain the identifier from the customer of customer device 120 or may generate the identifier automatically. Call server 402 may store the multimedia content and identifier (block 550). For example, call server 402 may store the multimedia content and identifier in a database, such as content database 410. Once stored, the multimedia content may be associated with a telephone number.

Figure 7:
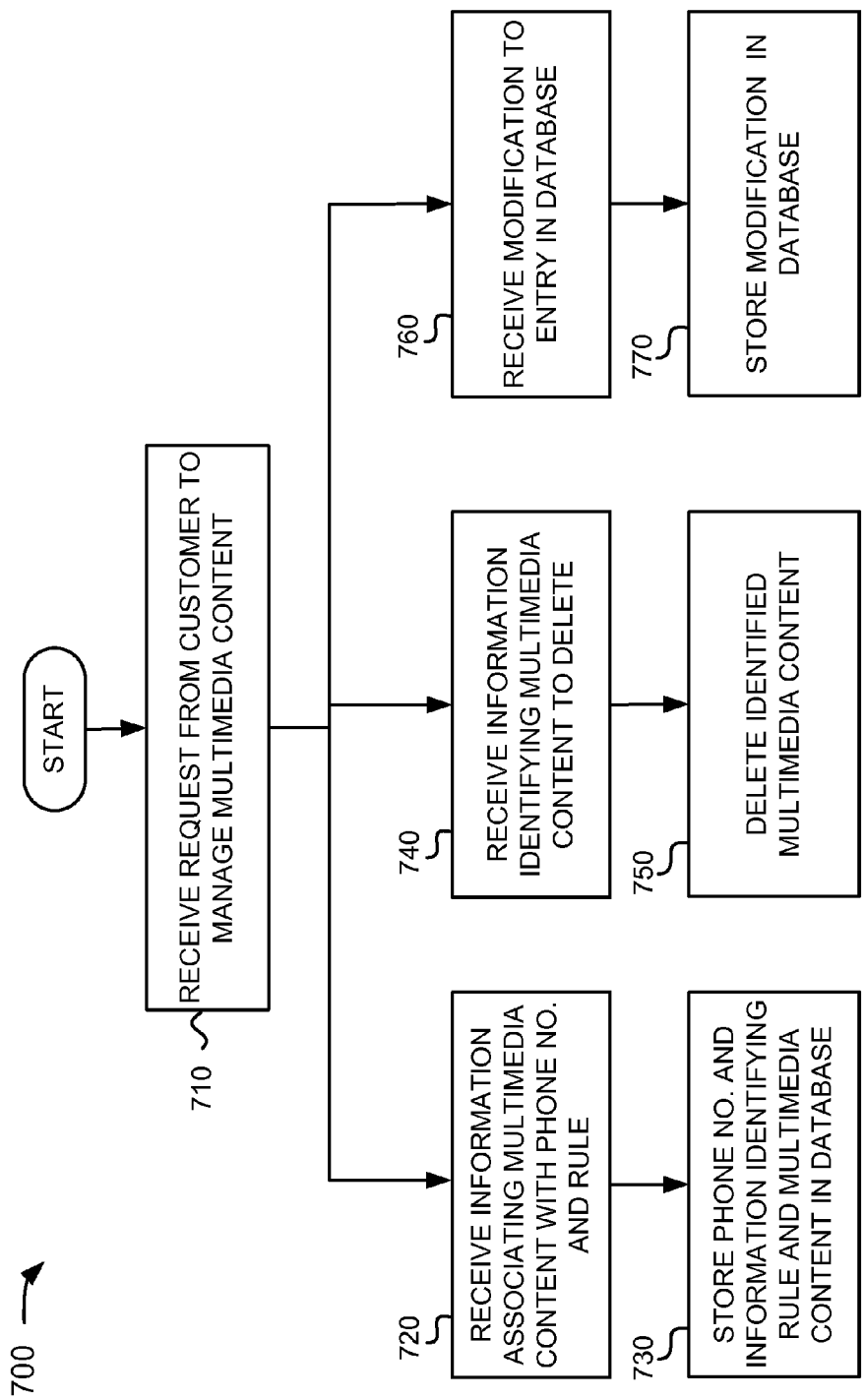
FIG. 7 is a flow chart of an exemplary process for managing multimedia content stored according to the processing described in FIG. 5.

FIG. 7 is a flow chart of an exemplary process 700 for managing multimedia content stored according to the processing described in FIG. 5. The processing described in FIG. 7 may be performed by call server 402 (e.g., via customer content management component 442). In another embodiment, some or all of the processing described in FIG. 7 may be performed by one or more devices separate from or in combination with call server 402.

Process 700 may include receiving a request from a customer to manage multimedia content (block 710). A customer may, using customer device 120, connect to call server 402. In one embodiment, customer 120 may connect to call server 402 via an Internet connection. In response, call server 402 may provide one or more graphical user interfaces (e.g., web pages) to customer device 120 to authenticate the customer. For example, call server 402 may request that the customer provide an identifier and/or password. Call server 402 may match the identifier and password to a list of registered identifier/password combinations. If the identifier and password match a registered identifier/password in the list, call server 402 may determine that the customer is properly authenticated. If the identifier and password do not match a registered identifier/password in the list, call server 402 may determine that the customer is not properly authenticated.

In response to the request (and authentication of the customer), call server 402 may provide graphical user interfaces to the customer, allowing the customer to manage multimedia content. For example, call server 402 may provide graphical user interfaces that allow the customer to associate multimedia content with a telephone number and a rule; delete multimedia content that has been uploaded by the customer; modify associations of multimedia content, a telephone number, and a rule, and/or perform other management functions relating to the multimedia content. Call server 402 may allow a customer to manage multimedia content in a self-service mode or a managed service mode. In the self-service mode (described in further detail below with respect to FIGS. 8A-8D), a customer may manage multimedia content by interacting with call server 402. In the managed service mode, a customer may submit information regarding desired telephone number/rule/multimedia content associations, information identifying modifications to uploaded content or telephone number/rule/multimedia content associations, information identifying multimedia content to be deleted, etc. to a system administrator associated with multimedia call platform 130, who may perform the management function(s) on the customer's behalf.

Figure 8A:
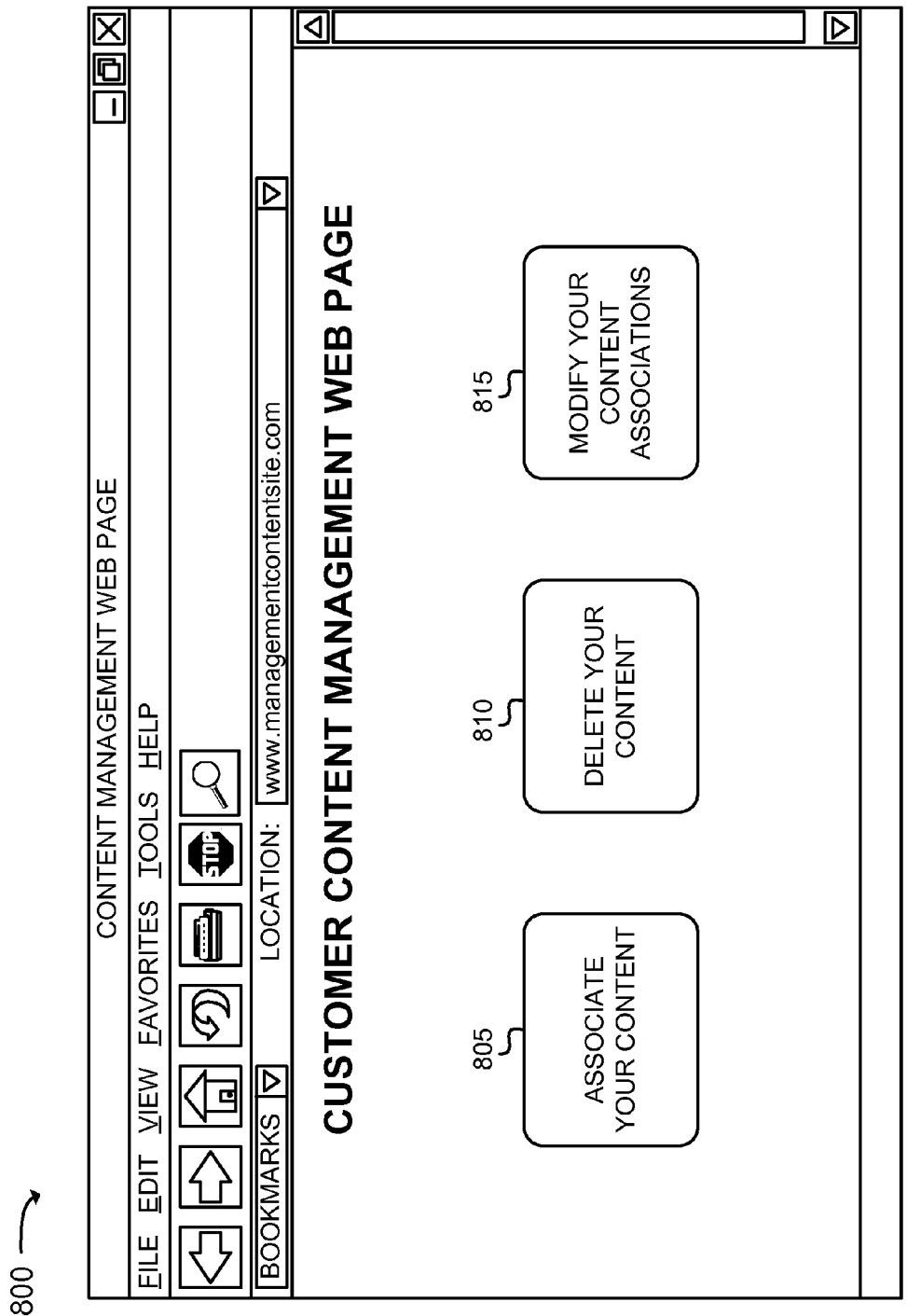
FIGS. 8A-8D are exemplary diagrams of graphical user interfaces that may be used to manage stored multimedia content.

FIG. 8A is an exemplary diagram of a graphical user interface 800 that may be provided to a customer in connection with managing multimedia content. As illustrated, graphical user interface 800 may include a first button 805 that allows a customer to associate multimedia content with a telephone number and a rule; a second button 810 that allows a customer to delete multimedia content that has been uploaded by the customer; and a third button 815 that allows the customer to modify an association of multimedia content, a telephone number, and a rule. In practice, graphical user interface 800 may include additional, fewer, different, and/or differently arranged information than illustrated in FIG. 8A.

Figure 8B:
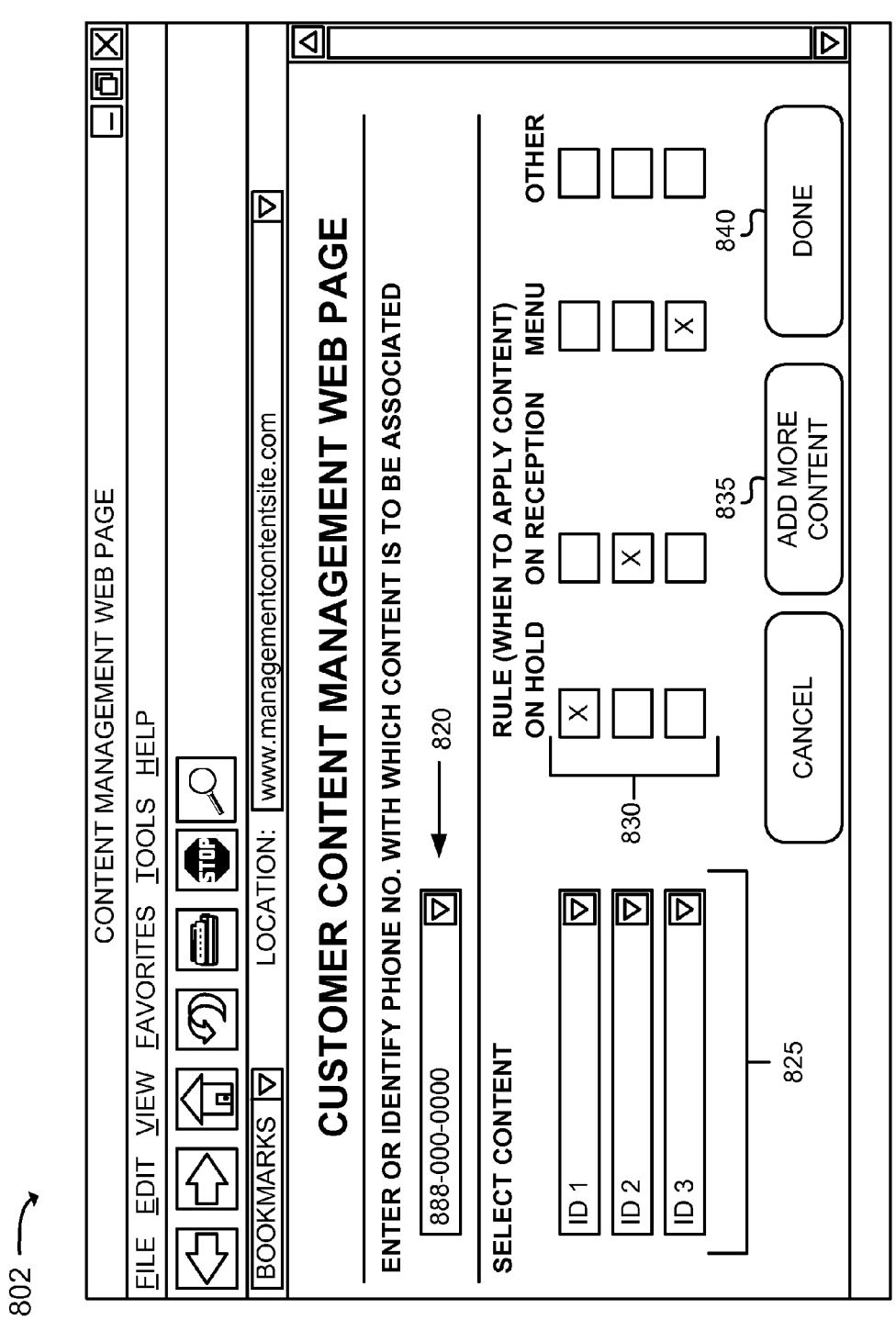

Assume that the customer selects first button 805, process 700 may include receiving information associating multimedia content with a telephone number and a rule (block 720), and storing, in a database, the telephone number and information identifying the rule and the multimedia content (block 730). FIG. 8B is an exemplary diagram of a graphical user interface 802 that may be provided to a customer in connection with associating multimedia content with a telephone number and a rule. As illustrated, graphical user interface 802 may provide a field 820 that allows the customer to specify a telephone number with which multimedia content is to be associated. Graphical user interface 802 may further include a group of fields 825 that allow the customer to specify multimedia content and an area 830 that allows the customer to specify one or more rules that may trigger the provisioning of the associated multimedia content. As illustrated, the customer may specify, for example, that identified multimedia content is to be provided when a telephone call is placed on hold, is to be provided upon reception of a telephone call to the telephone number identified in field 820, is to be provided based on user input in connection with a provided menu, or other types of rules. In one embodiment, upon selection of the box in the other category, call server 402 may provide one or more additional graphical user interfaces that allow the user to specify other rules for triggering the provisioning of the multimedia content. Graphical user interface 802 may further include a button 835 that allows the user to add additional multimedia content (e.g., by providing additional fields 825 for identifying multimedia content) and a button 840 that allows the customer to save the settings in graphical user interface 802 (e.g., saving an association of a telephone number, a rule, and multimedia content in rule database 408). In practice, graphical user interface 802 may include additional, fewer, different, and/or differently arranged information than illustrated in FIG. 8B.

Figure 8C:
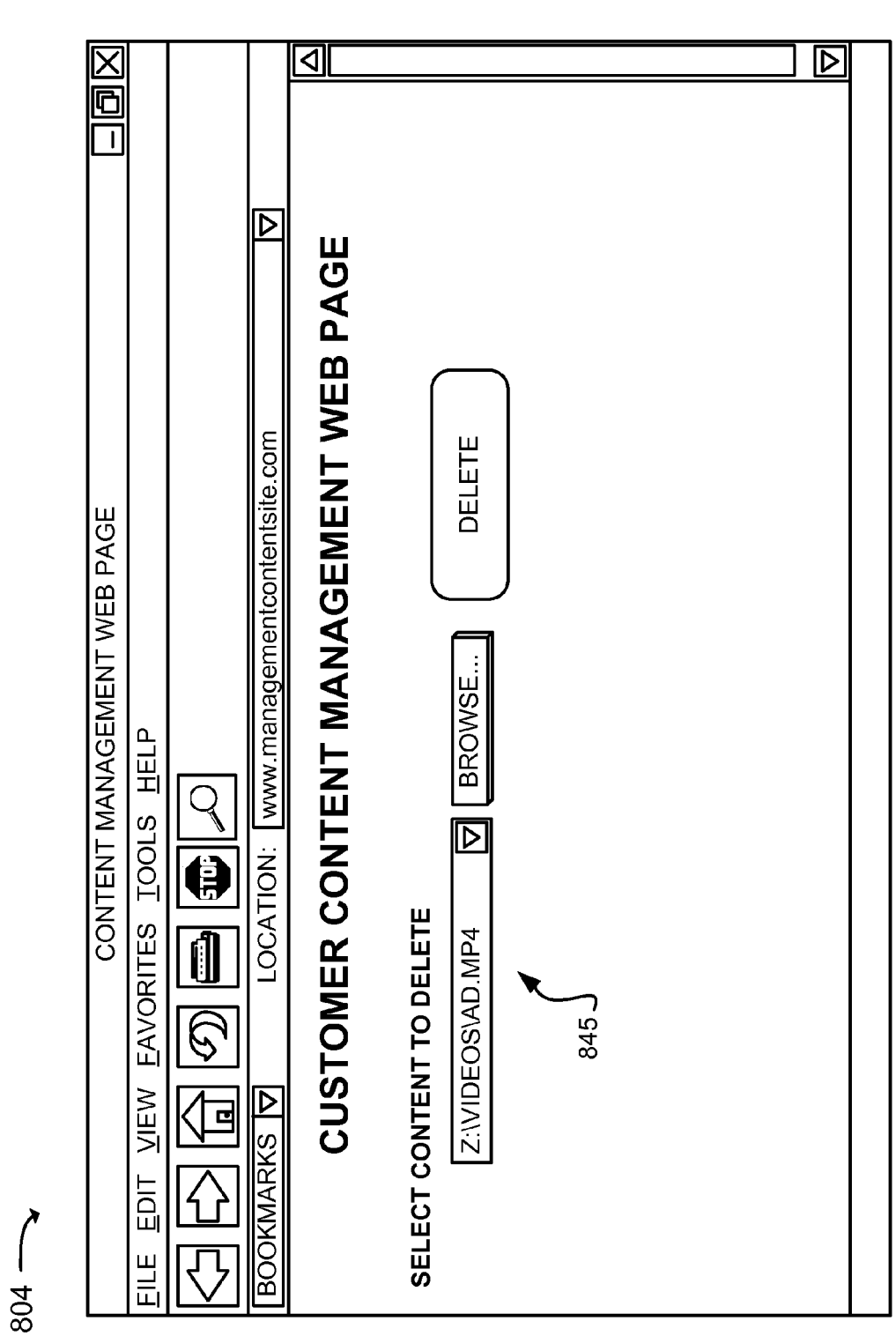

Assume, in FIG. 8A, that the customer selects second button 810, process 700 may include receiving information identifying multimedia content to delete (block 740), and deleting, from a database, the identified multimedia content (block 750). FIG. 8C is an exemplary diagram of a graphical user interface 804 that may be provided to a customer in connection with deleting multimedia content. As illustrated, graphical user interface 804 may provide a field 845 that allows the customer to specify multimedia content that is to be deleted. For example, a customer may identify multimedia content that is stored in content database 410 and select the DELETE button to cause content database 410 to delete the identified multimedia content. In practice, graphical user interface 804 may include additional, fewer, different, and/or differently arranged information than illustrated in FIG. 8C.

Figure 8D:
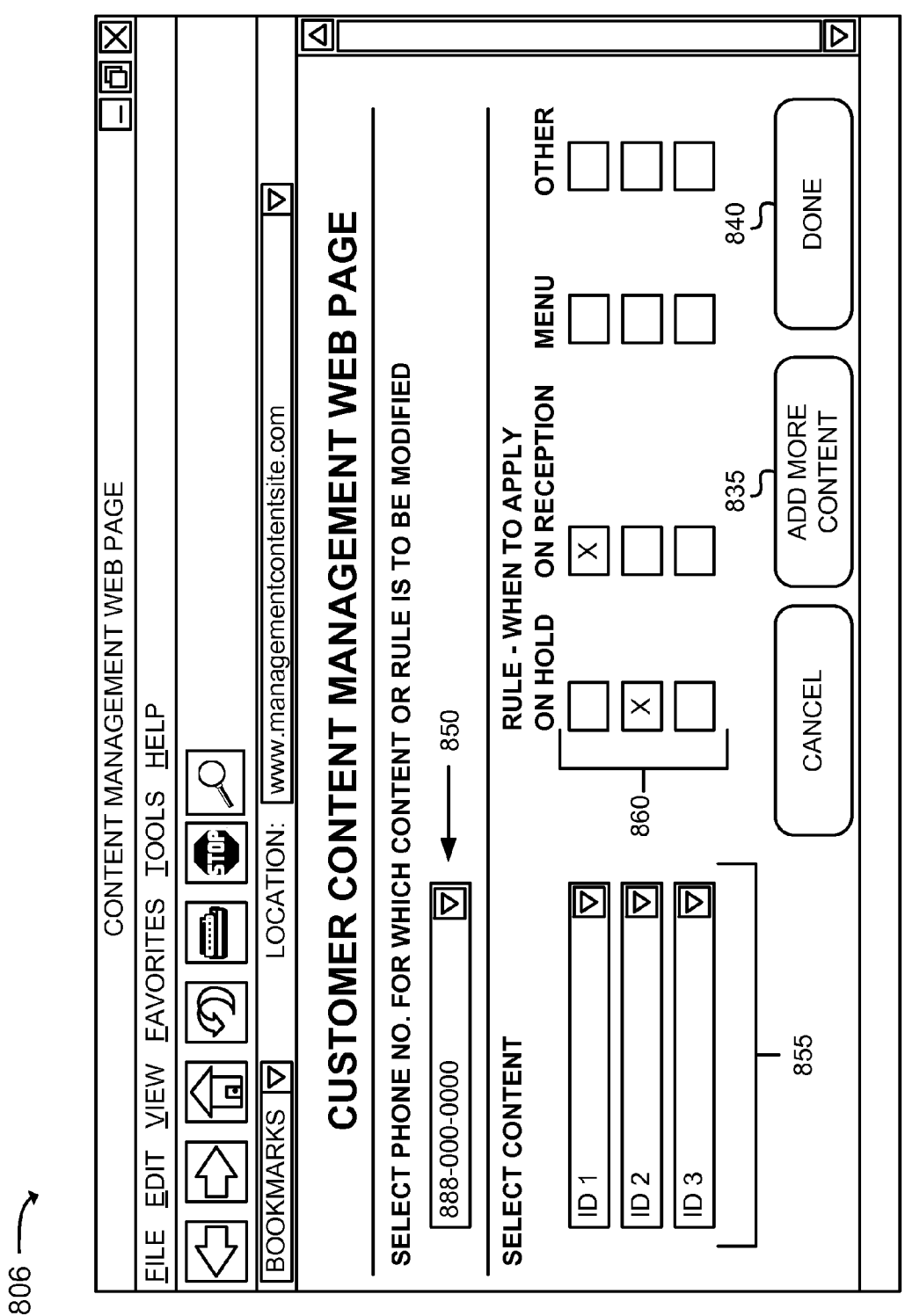

Assume, in FIG. 8A, that the customer selects third button 815, process 700 may include receiving a modification to an entry in rule database 408 (block 760), and storing, in database 408, the modified entry (block 770). FIG. 8D is an exemplary diagram of a graphical user interface 806 that may be provided to a customer in connection with modifying associations of a telephone number with a rule and multimedia content. As illustrated, graphical user interface 806 may provide a field 850 that allows the customer to specify a telephone number for which a change of multimedia or a rule is to be made. Graphical user interface 806 may further include a group of fields 855 that allows the customer to specify multimedia content and an area 860 that allows the customer to specify one or more rules that may trigger the provisioning of the associated multimedia content. Fields 855 and area 860 may be automatically populated once a telephone number is specified in field 850. Graphical user interface 806 may further include a button 835 that allows the user to add additional multimedia content (e.g., by providing additional fields 825 for identifying multimedia content) and a button 840 that allows the customer to save the settings in graphical user interface 802 (e.g., saving a modified association of a telephone number, a rule, and multimedia content in rule database 408). In practice, graphical user interface 806 may include additional, fewer, different, and/or differently arranged information than illustrated in FIG. 8D.

FIG. 9 is a flow chart of an exemplary process 900 for providing multimedia content to a user during a telephone call. The processing described in FIG. 9 may be performed by call server 402 (e.g., via user interface component 444). In another embodiment, some or all of the processing described in FIG. 9 may be performed by one or more devices separate from or in combination with call server 402.

Process 900 may include receiving a telephone call to a telephone number and from a user device (block 910). In one embodiment, a user (e.g., via user device 110) may place a telephone call to multimedia call platform 130. Call server 402 may receive the telephone call.

Process 900 may also include identifying a rule and multimedia content associated with the telephone number (block 920). For example, call server 402 may access rule database 408, using the dialed telephone number, to identify a rule (from field 452, FIG. 4D) and multimedia content (from field 454, FIG. 4D).

Process 900 may further include detecting an event associated with the identified rule (block 930). For example, call server 402 may monitor a telephone call to detect the reception of the telephone call, that the telephone call has been placed on hold, that the user has entered a particular input (e.g., in connection with a provided menu), etc. Process 900 may include providing, in response to detecting the event, the identified multimedia content to user device 110 (block 940). For example, call server 402 may retrieve an identifier for the particular multimedia content from field 454 of rule database 408 and use this identifier to retrieve the particular multimedia content from content database 410. Call server 402 may provide the retrieved multimedia content to user device 110, via network 140. In one embodiment, call server 408 may invoke one or more media servers for providing the multimedia content to user device 110. In the event that user device 110 does not have the ability to support the provided multimedia content (or the video file format of the provided multimedia content), call server 402 may provide the audio portion of the multimedia content to user device 110.

Process may include determining whether the telephone call has been satisfied (block 950). Call server 402 may provide information to the user during the processing of the telephone call. For example, call server 402 may provide one or more menu options to the user (possibly in video format) and provide, in connection with the user's selection of particular menu options, information (including multimedia content) to the user. In this way, the telephone call may be satisfied prior to transferring the call to an agent at an agent device 404. In one embodiment, call server 402 may audibly ask the user whether the information (including multimedia content) satisfied the user's request. Additionally, or alternatively, call server 402 may detect whether the user has disconnected the telephone call (e.g., by hanging up).

If call server 402 determines that the call has been satisfied (block 950—YES), processing may end (e.g., processing may return to block 910 with call server 402 receiving another telephone call from the user or another user). If, on the other hand, call server 402 determines that the request has not been satisfied (block 950—NO), call server 402 may transfer the call to an agent at an agent device 404 (block 960). In an exemplary embodiment, call server 402 may continue to monitor the telephone call between the user at user device 110 and the agent at agent device 404, and provide multimedia content to the user if an event, which triggers a rule associated with the dialed telephone number, has been detected. For example, if the rule indicates that a particular advertisement is to be provided if a telephone call is placed on hold and the agent at agent device 404 places the telephone call on hold, call server 402 may provide the particular advertisement to user device 110.

Figure 10B:
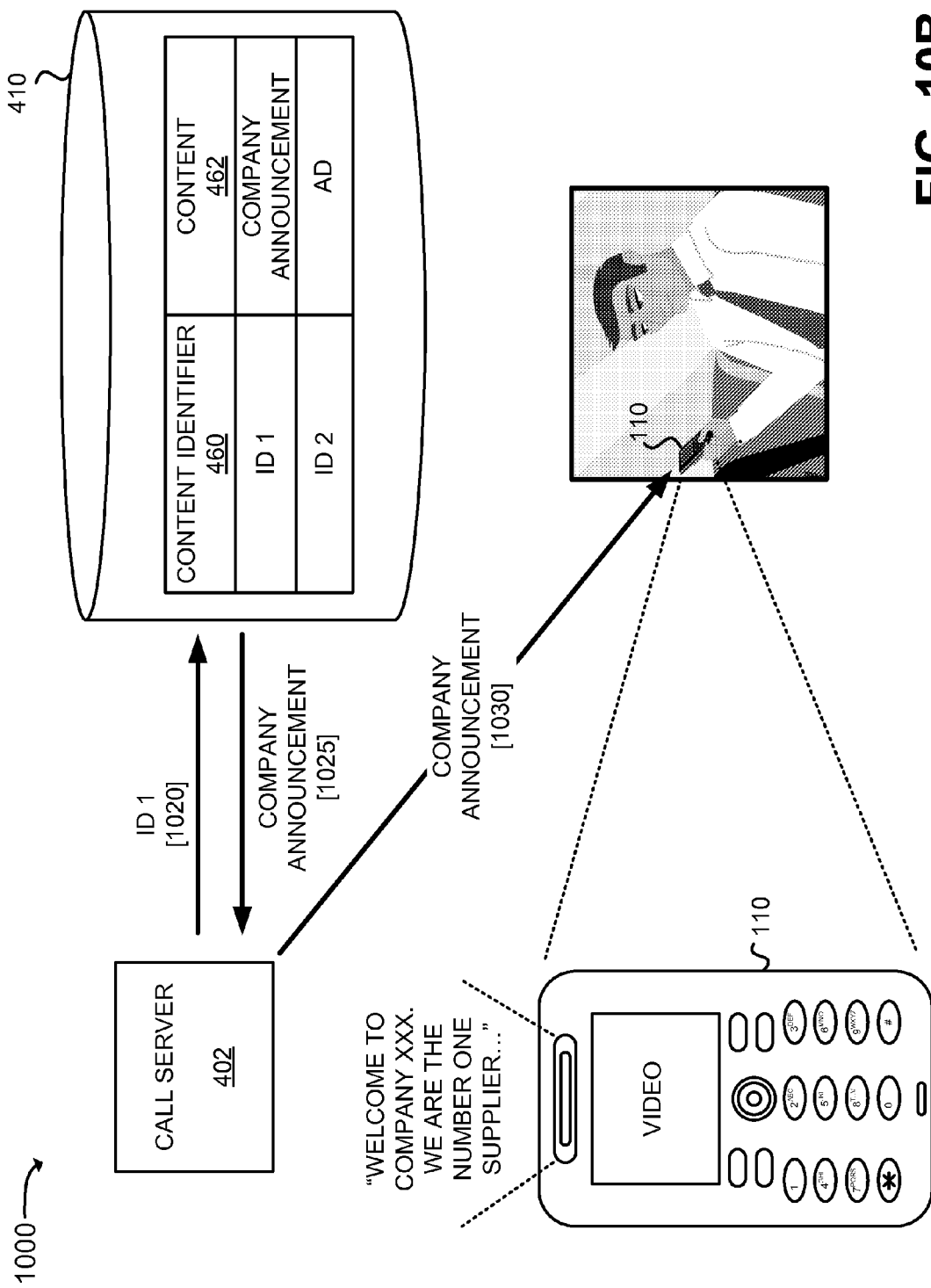

FIGS. 10A-10D provide an example 1000 of the processing described in FIG. 9. In example 1000, assume that a user at a user device 110 (illustrated as a cellular telephone in FIG. 10A) places a toll-free telephone call to a call center, by dialing 888-000-0000. Call server 402 may receive the telephone call (act 1005). Upon receipt of the toll-free telephone call, call server 402 may access rule database 408, using the dialed telephone number (i.e., 888-000-0000) (act 1010). As illustrated in FIG. 10A, assume that rules database 408 includes two entries for telephone number 888-000-0000. The first entry indicates that upon reception of a call to telephone number 888-000-0000, multimedia content, identified as ID 1, is to be provided to the calling device. The second entry indicates that if a telephone call to 888-000-0000 is placed on hold, multimedia content, identified as ID 2, is to be provided to the calling device. Thus, in example 1000, call server 402 may determine, based on receipt of the telephone call from user device 110, that multimedia content ID 1 is to be provided to user device 110. Call server 402 may retrieve the identifier of the multimedia content (i.e., ID 1) from rules database 408 (act 1015).

Turning to FIG. 10B, call server 402 may access content database 410, using the identifier of the multimedia content (i.e., ID 1) (act 1020). As illustrated in FIG. 10B, assume that content database 410 associates identifier ID 1 with a company announcement video. Thus, in example 1000, call server 402 may retrieve the company announcement video from content database 410 (act 1025). Call server 402 may provide the company announcement video to user device 110 (act 1030). As illustrated in FIG. 10B, user device 110 may, in response to receiving the company announcement video, play the video for the user.

Figure 10C:
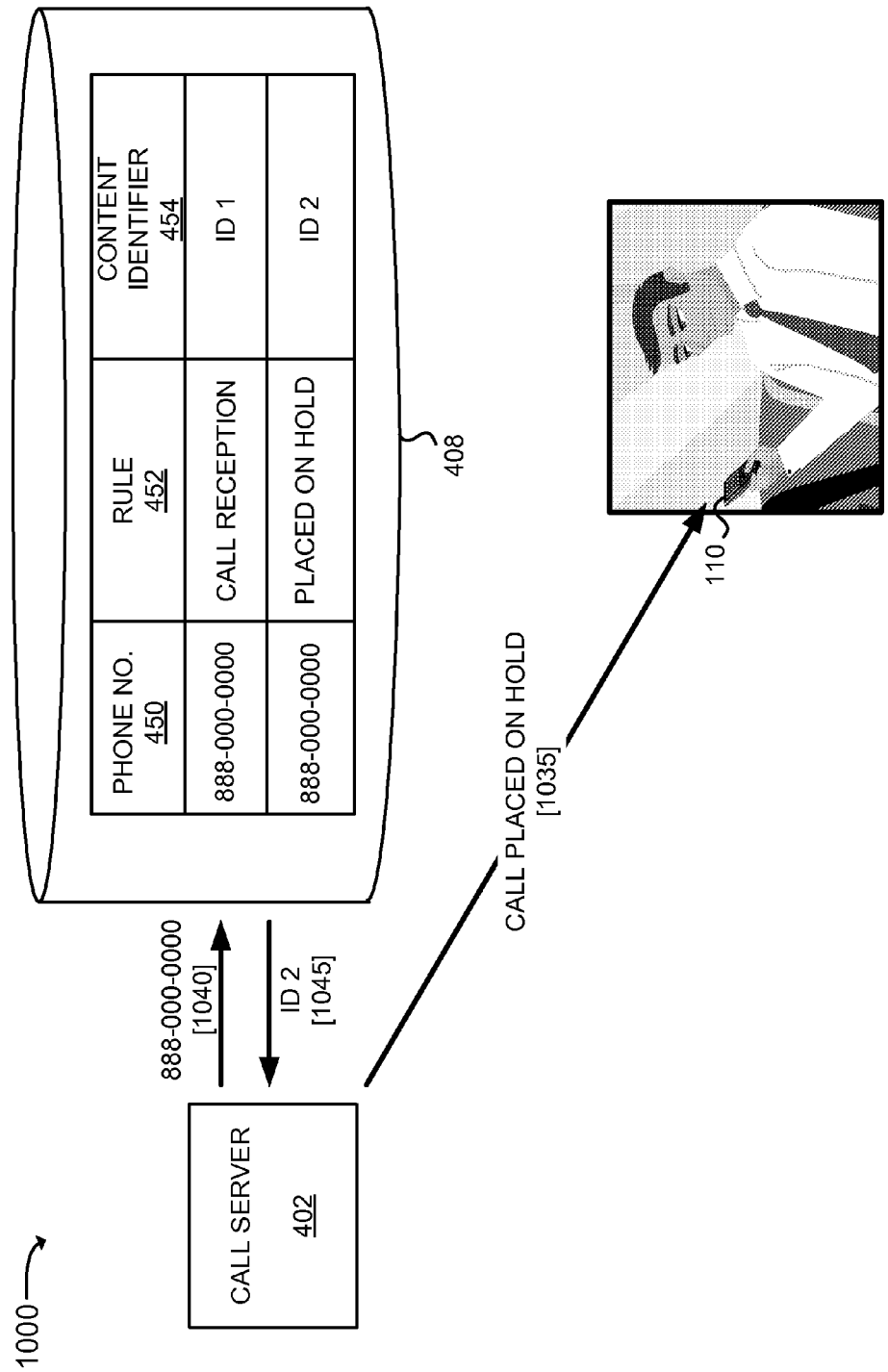

Turning to FIG. 10C, assume that the user, after watching the company announcement video, provides an indication to call server 402 that the user wants to connect to a call center agent. In response, call server 402 may place the telephone call on hold, as call server 402 begins the process of identifying an appropriate/available call center agent for the telephone call and transferring the telephone call to an appropriate agent device 404. Call server 402 may detect the event of placing the telephone call on hold (act 1035), and access rule database 408 using the dialed telephone number (i.e., 888-000-0000) (act 1040). Thus, in example 1000, call server 402 may determine, based on the telephone call from user device 110 being placed on hold, that multimedia content ID 2 is to be provided to user device 110. Call server 402 may retrieve the identifier of the multimedia content (i.e., ID 2) from rules database 408 (act 1045).

Figure 10D:
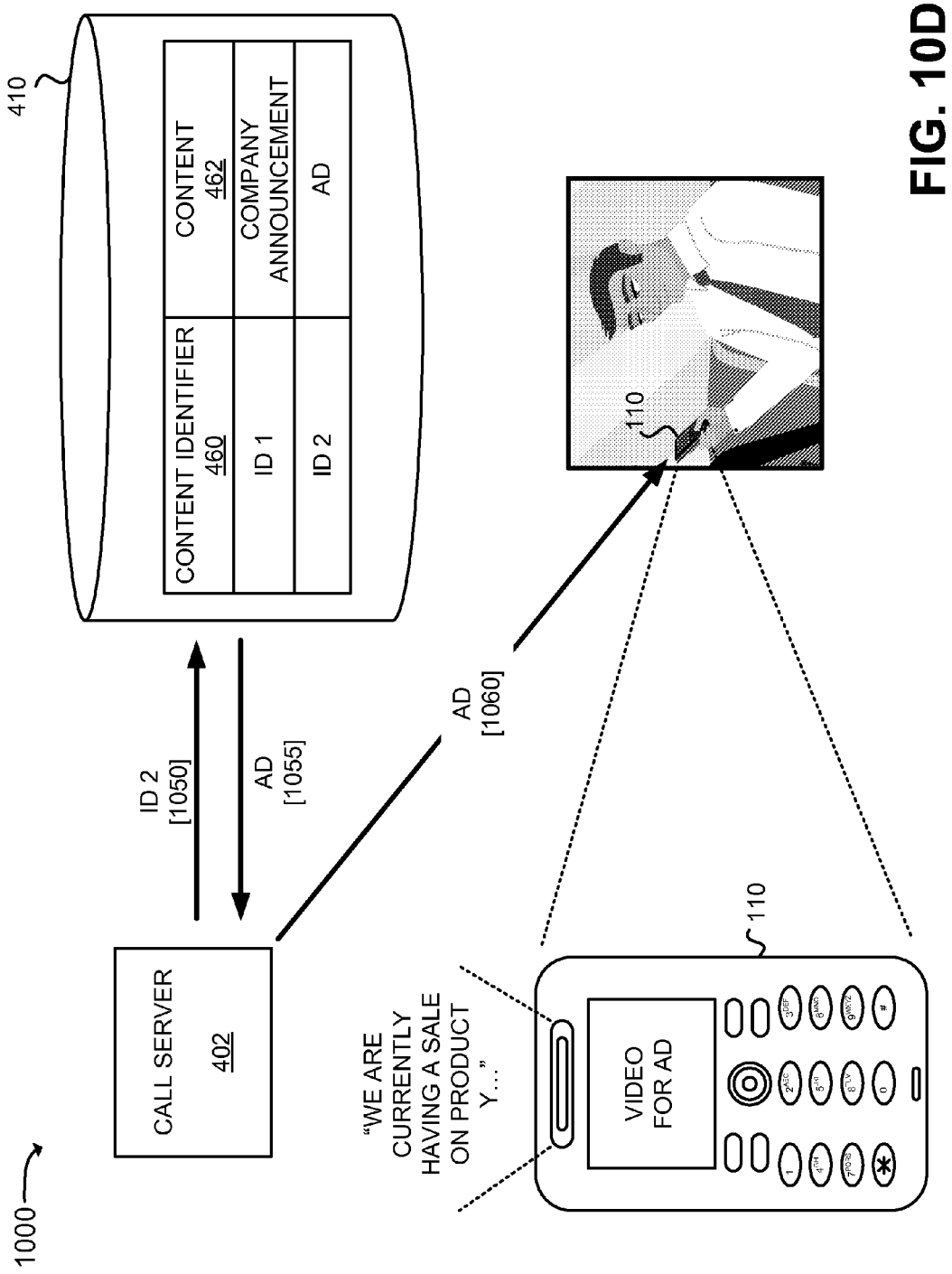

Turning to FIG. 10D, call server 402 may access content database 410, using the identifier of the multimedia content (i.e., ID 2) (act 1050). As illustrated in FIG. 10D, assume that content database 410 associates identifier ID 2 with a video advertisement. Thus, in example 1000, call server 402 may retrieve the video advertisement from content database 410 (act 1055). Call server 402 may provide the video advertisement to user device 110 (act 1060). As illustrated in FIG. 10D, user device 110 may, in response to receiving the video, play the video advertisement for the user. In this way, rich multimedia content may be provided to calling parties in connection with received telephone calls.

FIG. 11 is a flow chart of an exemplary process 1100 for generating billing events in connection with multimedia content. The processing described in FIG. 11 may be performed by billing device 406. In another embodiment, some or all of the processing described in FIG. 11 may be performed by one or more devices separate from or in combination with billing device 406.

Process 1100 may include monitoring customer activities (block 1110). In one embodiment, call server 402 may monitor a customer's interactions with multimedia call platform 130. The interactions may include monitoring when a customer uploads multimedia content to multimedia call platform, monitoring the quantity of multimedia content uploaded by a customer, monitoring the size of the multimedia content uploaded by a customer, monitoring a customer's management of multimedia content uploaded to multimedia call platform 130, monitoring the provisioning of a customer's uploaded multimedia content to a user device (i.e., the quantity of multimedia content provided in connection with a telephone call, the amount of time that multimedia content is provided in connection with a telephone call, etc.), and/or other customer interactions.

Process 1100 may further include billing the customer based on the monitored activities (block 1120). For example, billing device 406 may generate a bill each time the customer uploads multimedia content to multimedia call platform 130, bill a customer based on the quantity of multimedia content uploaded by the customer, bill a customer based on the size of the multimedia content uploaded by a customer, bill a customer each time the customer performs a management function in relation to uploaded multimedia content (e.g., each time the customer modifies a telephone number/rule/multimedia content association), bill a customer each time the customer's uploaded multimedia content is provided to a user device, etc.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5, 7, 9, and 11, the order of the blocks may be modified in other embodiments. Further, non-dependent blocks may be performed in parallel.

It will be apparent that aspects, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   maintaining, at a network device, an association of a telephone number of a first user device with:
      information identifying a rule, and
      information identifying multimedia content to be provided when the rule is satisfied;
   receiving, by the network device, a telephone call from a second user device;
   determining, by the network device, that the telephone call is directed to the telephone number;
   identifying, by the network device, the rule based on the telephone call being directed to the telephone number;
   monitoring, by the network device and based on identifying the rule, the telephone call between the second user device and the first user device;
   determining, by the network device and based on monitoring the telephone call, that a particular input is received during the telephone call between the second user device and the first user device;
   determining, by the network device and based on the particular input being received, that the rule is satisfied; and
   providing, by the network device and during the telephone call, the multimedia content to the second user device based on the rule being satisfied.

2. The method of claim 1, where the network device is associated with a call center.

3. The method of claim 1, further comprising:
   receiving information identifying the telephone number,
   receiving the information identifying the multimedia content,
   receiving information defining the rule, and
   storing the information identifying the telephone number, the information identifying the multimedia content, and the information defining the rule.

4. The method of claim 1, further comprising:
   receiving, prior to the maintaining the association, the multimedia content from the first user device;
   formatting the multimedia content to a particular format when the received multimedia content does not comprise the particular format;
   receiving an identifier for the received multimedia content; and
   associating the identifier with the formatted multimedia content.

5. The method of claim 1, where the multimedia content includes:
   a video segment, and
   an audio segment that is separate from the video segment.

6. The method of claim 1, where the telephone number is a toll-free telephone number associated with a call center.

7. The method of claim 1, where the multimedia content includes video content and audio content.

8. The method of claim 1, where determining that the rule is satisfied further includes:
   determining that the rule is satisfied, when the particular input is received, further based on at least one of:
      a time of day,
      a day of week,
      a telephone number associated with the second user device, a location of the second user device, or a request, associated with the second device, not being satisfied during the telephone call.

9. The method of claim 1, where the particular input is based on a menu of options provided to the second user device, the method further comprising:
   providing, during the telephone call, the menu of options to the second user device; and
   receiving, based on providing the menu of options, the particular input from the second user device.

10. The method of claim 1, further comprising:
   generating a bill based on at least one of:
      maintaining the association, or
      providing the multimedia content to the second user device.

11. The method of claim 1, further comprising:
   receiving, from the first user device, a request to modify one or more of the telephone number, the rule, or the multimedia content; and
   providing, based on the request, one or more graphical user interfaces, to the first user device, to allow the one or more of the telephone number, the rule, or the multimedia content to be modified.

12. The method of claim 1, where the rule comprises a first rule, the method further comprising:
   receiving second multimedia content from the first user device,
   receiving information defining a second rule for providing the second multimedia content,
   the second rule being different than the first rule,
   associating the second rule and the second multimedia content with the telephone number,
   determining, based on monitoring the telephone call and after providing the multimedia content, that the second rule is satisfied, and
   providing, based on the second rule being satisfied, the second multimedia content to the second user device during the telephone call.

13. A system comprising:
   a network device to:
      associate a telephone number of a first user device with information identifying a rule and information identifying multimedia content that is to be provided when the rule is satisfied,
      receive a telephone call from a second user device,
      determine that the telephone call is directed to the telephone number,
      identify the rule based on the telephone call being directed to the telephone number,
      monitor the telephone call,
      determine, based on monitoring the telephone call, that a particular input is received during the telephone call,
      determine that the rule is satisfied based on the particular input being received during the telephone call, and
      provide, based on the rule being satisfied, the multimedia content to the second user device.

14. The system of claim 13,
   where the network device is included in a customer call center.

15. The system of claim 13, where the rule comprises a first rule and the telephone number is associated with a customer, and
   where the network device is further to:
      receive second multimedia content from the customer,
      receive information defining a second rule for providing the second multimedia content,
      the second rule being different than the first rule,
      associate, based on receiving an indication from the customer, the second rule and the second multimedia content with the telephone number,
      determine, based on monitoring the telephone call and after providing the multimedia content, that the second rule is satisfied, and
      provide, based on the second rule being satisfied, the second multimedia content to the second user device.

16. The system of claim 15, where the particular format includes a Moving Picture Experts Group-4 (MPEG-4) format.

17. The system of claim 15, where the formatted second multimedia content includes:
   a video segment, and
   an audio segment that is separate from the video segment.

18. The system of claim 13, where the multimedia content includes video content and audio content.

19. The system of claim 18, where, when providing the multimedia content, the network device is to:
   determine whether the second user device supports a format of the video content,
   provide the video content and the audio content when the user device is determined to support the format of the video content, and
   provide only the audio content when the user device is determined not to support the format of the video content.

20. The system of claim 13, where determining that the rule is satisfied includes:
   determining that the rule is satisfied, when the particular input is received, further based on at least one of:
   a time of day,
   a day of week,
   a telephone number associated with the second user device, or
   a location of the second user device.

21. A call server comprising:
   a memory to store instructions; and
   a processor to execute the instructions to:
      receive multimedia content from a device associated with a customer,
      format the multimedia content to a particular format when the received multimedia content does not comprise the particular format,
      receive, from the device, information defining a rule that specifies when the multimedia content is to be provided,
      receive, from the device, an indication to associate the rule and the multimedia content with a particular telephone number, of a plurality of telephone numbers, associated with the customer,
      store, based on the indication, information associating the telephone number, the rule, and the multimedia content,
      receive a telephone call from a user device,
      determine that the telephone call is directed to the particular telephone number,
      monitor the telephone call,
      determine, based on monitoring the telephone call that a particular input is received during the telephone call,
      determine, based on the particular input being received during the telephone call, that the rule is satisfied, and
      provide, based on the rule being satisfied, the multimedia content to the user device.

22. The call server of claim 21, where, when receiving the multimedia content from the device, the processor is further to execute the instructions to at least one of:

receive, from the device, a selection of the multimedia content from a database of multimedia content that is associated with the call server, or receive from another device, that is not associated with the customer and is not associated with the call server:
the multimedia content,
an identifier of the multimedia content, and
information identifying a storage location of the multimedia content.

23. The call server of claim 21, where the formatted multimedia content includes:
a video segment, and
an audio segment that is separate from the video segment.

24. The call server of claim 23,
where, when providing the multimedia content, the processor is further to execute the instructions to:
determine whether the user device supports the particular format,
provide the video content and the audio content when the user device supports the particular format, and
provide only the audio content when the user device does not support the particular format.

\* \* \* \* \*